United States Patent [19]
Go

[11] Patent Number: 6,101,277
[45] Date of Patent: Aug. 8, 2000

[54] IMAGE ENCODING AND DECODING METHOD AND APPARATUS USING EDGE SYNTHESIS AND INVERSE WAVELET TRANSFORM

[75] Inventor: Shiyu Go, Tokyo, Japan

[73] Assignee: Oki Electric Industry Co., Ltd., Tokyo, Japan

[21] Appl. No.: 09/082,729

[22] Filed: May 21, 1998

Related U.S. Application Data

[62] Division of application No. 08/548,943, Oct. 26, 1995, Pat. No. 5,761,341.

[30] Foreign Application Priority Data

Oct. 28, 1994 [JP] Japan .................................. 6-264835
Oct. 28, 1994 [JP] Japan .................................. 6-264836
Jun. 16, 1995 [JP] Japan .................................. 7-150142

[51] Int. Cl.[7] ............................................. G06K 9/36
[52] U.S. Cl. ............................................... 382/236
[58] Field of Search .................................. 382/232, 233, 382/236, 238, 240, 242, 248, 250; 358/432, 433; 348/384, 394, 395, 400–404, 407–416, 420, 421, 425, 430, 431, 699

[56] References Cited

U.S. PATENT DOCUMENTS

| | | |
|---|---|---|
| 5,420,636 | 5/1995 | Kojima . |
| 5,481,269 | 1/1996 | Imhoff et al. . |
| 5,495,292 | 2/1996 | Zhang et al. ............................ 348/407 |
| 5,546,477 | 8/1996 | Knowles et al. . |
| 5,561,724 | 10/1996 | Kido et al. . |
| 5,598,481 | 1/1997 | Nishikawa et al. . |
| 5,661,822 | 8/1997 | Knowles et al. . |
| 5,761,341 | 6/1998 | Go .......................................... 382/232 |
| 5,878,172 | 3/1999 | Go .......................................... 382/266 |
| 5,949,910 | 9/1999 | Go .......................................... 382/233 |
| 5,991,448 | 11/1999 | Go .......................................... 382/236 |

FOREIGN PATENT DOCUMENTS

0 679 032  10/1995  European Pat. Off. .

OTHER PUBLICATIONS

R. Montúfar–Chaveznava et al., "Astronomical Image Coding using an Edge and Texture Model", Proceedings of the IEEE–SP International Symposium of Time–Frequency and Time Scale Analysis (Oct. 25–28, 1994) pp. 148–151.

P.J. Burt et al., "The Laplacian Pyramid as a Compact Image Code", IEEE Transaction on Communications, vol. No. 4. (Apr. 1983) pp. 532–540.

Stephane Mallet et al., "Compact Image Coding from Edges with Wavelets", ICASSP 91: 1991 International Conference on Acoustics, Speech and Signal Processing, Toronto, Ontario, Canada (May 14–17, 1991) pp. 2745–2748.

*Primary Examiner*—Jose L. Couso
*Attorney, Agent, or Firm*—Venable; Robert J. Frank; Allen Wood

[57] ABSTRACT

A digitized image is encoded by detecting edges in the image, encoding the position and sharpness of the detected edges, smoothing and reducing the size of the digitized image, and encoding the resulting reduced image. A digitized image encoded in this way is reconstructed by generating a horizontal edge image and a vertical edge image, or a horizontal edge image, a vertical edge image, and a diagonal edge image, from the encoded edge position and sharpness information, smoothing each of these edge images by a series of filters to obtain a series of edge images, filtering each edge image in each series with an edge synthesis filter to synthesize a high-frequency image, decoding the reduced image, and performing an inverse wavelet transform on the decoded reduced image and the high-frequency images.

9 Claims, 26 Drawing Sheets

IMAGE ENCODING AND DECODING METHOD AND APPARATUS USING EDGE SYNTHESIS AND INVERSE WAVELET TRANSFORM

CROSS REFERENCE TO RELATED APPLICATION

This is a division under 35 U.S.C. 120 of parent application, Ser. No. 08/548,943, filed Oct. 26, 1995 now U.S. Pat. No. 5,761,341 the disclosure of which is incorporated herein by reference.

BACKGROUND OF THE INVENTION

This invention relates to a compressive image encoding and decoding method using edge synthesis and the inverse wavelet transform, and to digital image encoding and decoding devices employing this method.

Compression is essential for efficient storage and transmission of digitized images. Compression methods have been described by the Joint Photographic Experts Group (JPEG) for still images, and the Motion Picture Experts Group (MPEG) for moving images. The JPEG method involves a discrete cosine transform (DCT), followed by quantization and variable-length encoding. The MPEG method involves detecting motion vectors. Both methods require substantial computation, the detection of motion vectors being particularly demanding.

Recently there has been much interest in the wavelet transform as a means of obtaining high compression ratios with relatively modest amounts of computation. This transform employs a family of wavelets related by dilation and translation; that is, the family consists of occurrences of the same basic wavelet at different locations and on different scales. If the scales form a progressively doubling sequence, and if the basic wavelet is zero everywhere except in a limited domain, wavelet transforms and inverse wavelet transforms can be carried out with efficient computational algorithms.

A wavelet transform can be described as a filtering process executed at each wavelet scale. A digitized image, for example, is transformed by filtering with the basic wavelet, then with the basic wavelet dilated by a factor of two, then with the basic wavelet dilated by a factor of four, and so on.

One prior-art wavelet encoding scheme employs a complementary pair of wavelets to divide an image into a high-frequency component and a low-frequency component. These components contain information about variations on scales respectively less than and greater than a certain cut-off scale. This process is iterated on the low-frequency component with a doubling of the wavelet scale, obtaining new low-frequency and high-frequency components, then iterated again on the new low-frequency component, and so on. After a certain number of iterations, the components are encoded by an encoding scheme that works from low- toward high-frequency information. This scheme enables accurate image reconstruction, but retains too much high-frequency information to achieve high compression ratios.

Another prior-art wavelet encoding scheme employs a basic wavelet that is the first derivative of a smoothing filter (that is, the first derivative of a low-pass filtering function). This type of wavelet acts as a high-pass filter. High-frequency information is obtained by detecting local peaks (local maxima of absolute values) in the result of the wavelet transform, which correspond to edges in the original image. The size and location of the peak values at a selected scale are encoded, a long with a low-frequency image obtained by smoothing at the largest scale of the wavelet transform. Fairly high compression ratios can be obtained in this way.

To reconstruct the original image from the encoded data, this prior-art method employs an algorithm derived from a mathematical, procedure involving iterated projections in Hilbert space. Under ideal conditions, the projections converge toward a unique set of data that (i) have the required local peak values and (ii) are within the range of the wavelet transform operator. An inverse wavelet transform is then carried out on the converged data to obtain the original image.

It has yet to be shown, however, that the projections always converge, or that data satisfying conditions (i) and (ii) are unique. In practice, there is difficulty in knowing when to stop iterating. For some images, it seems that data satisfying (i) and (ii) are not unique, and instead of converging, the iteration wanders endlessly through Hilbert space, first approaching the desired image transform, then moving away again.

A further problem of edge-based encoding schemes in general is that encoding efficiency tends to be impaired by edge fragmentation and irregularity.

SUMMARY OF THE INVENTION

It is accordingly an object of the present invention to encode digitized images efficiently, with a high compression ratio but without requiring extensive computation.

Another object of the invention is to encode moving images efficiently.

Still another object is to reduce irregularity of edges.

Yet another object is to avoid fragmentation of edges.

Still another object is to reconstruct digitized images from encoded information efficiently and reliably.

Yet another object is to reconstruct digitized moving images efficiently and reliably.

The invented method of encoding a digitized image comprises the steps of:

detecting edges in the digitized image;

encoding the position and sharpness of the detected edges to generate edge image information;

filtering and down-sampling the digitized image to generate a reduced image; and encoding the reduced image to generate reduced image information.

Detecting edges in the digitized image may comprise the further steps of thickening the detected edges, then trimming each edge to a uniform thickness.

The invented method of reconstructing a digitized image encoded by the invented encoding method comprises the steps of:

generating a set of decoded edge images from the above edge image information;

filtering these decoded edge images to generate a series of sets of decoded edge images that are increasingly smooth, or increasingly small in size;

synthesizing a series of sets of high-frequency images by filtering the decoded edge images with respective edge synthesis filters;

decoding the reduced image information to obtain a decoded reduced image; and performing an inverse wavelet transform on the decoded reduced image and the above sets of high-frequency images.

DETAILED DESCRIPTION OF THE INVENTION

Figure 1:
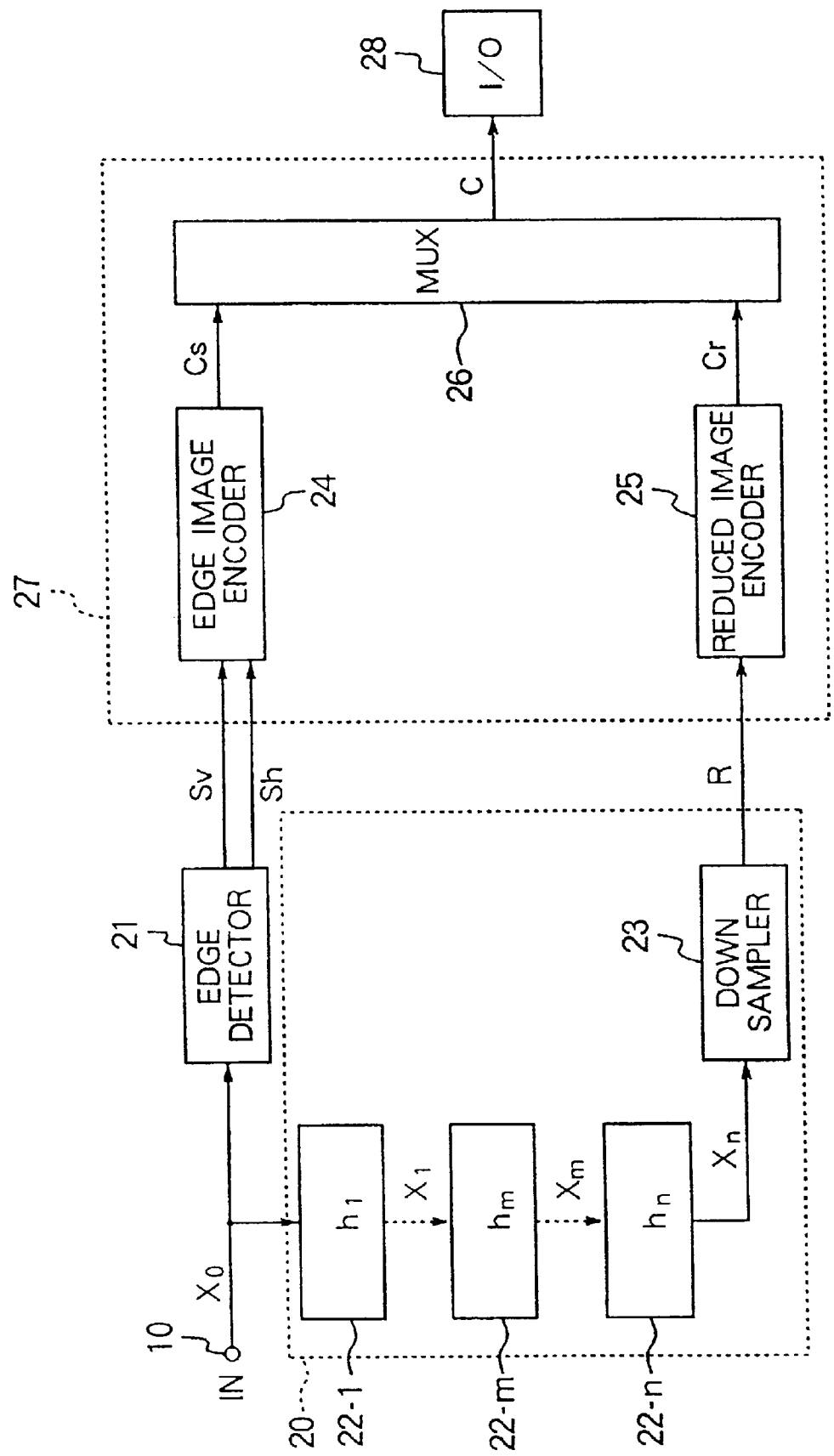
FIG. 1 is a block diagram of the digital image encoder in a first embodiment of the invention.

Embodiments of the invention will be described with reference to the attached illustrative drawings. The following terminology will be used.

A (two-dimensional) digitized image is an array of pixels having values x(i, j), where the horizontal coordinate i and vertical coordinate j range over sets of integers. The range of these coordinates is the size of the image, i.e., the number of pixels in the horizontal and vertical directions. The pixel values represent, for example, intensity gradations.

A one-dimensional image is a horizontal or vertical line in a two-dimensional digitized image, i.e., a set of pixels with values x(i) indexed by a single coordinate.

A standard edge is a one-dimensional image having just one sharp variation point. An example would be an image with pixel values that change first at one constant rate, then at a different constant rate, such as the following:

. . . 2.0 1.5 1.0 0.5 0 0.5 1.0 1.5 2.0 . . .

In this standard edge the pixel values first decrease at a rate of −0.5 per pixel, then increase at a rate of +0.5 per pixel. A standard edge serves as a basic model for all the edges occurring in a digitized image.

Down-sampling a digitized image means reducing its size by a process generally analogous to photographic reduction: by selecting every n-th pixel, for example, where n is a suitable integer. Up-sampling means increasing the size of an image by interpolating new pixels between the existing pixels.

A (one-dimensional) filter is a set of coefficients $f(k)$, where k ranges over the integers. The non-zero coefficients $f(k)$ are the taps of the filter.

The Fourier transform F of a filter f is defined as follows, where summation is over all taps, e is the natural logarithm base, and j is the square root of minus one.

$$F(\omega) = \sum_k f(k) \cdot e^{-j\omega k}$$

The conjugate $f^*$ of a filter f is obtained by reversing the order of coefficients:

$$f^*(k) = f(-k)$$

The Fourier transform of $f^*$ is therefore the complex conjugate of the Fourier transform of f.

A filter has even symmetry around $i_0$ if it has equal values on both sides of $i_0$; that is, for all values of k:

$$f(i_0 - k) = f(i_0 + k)$$

In particular, a filter has even symmetry around zero if it is equal to its own conjugate.

A filter has odd symmetry around $i_0$ if it has opposite values on both sides of $i_0$, that is:

$$f(i_0 - k) = -f(i_0 + k)$$

A filter satisfies the exact reconstruction condition if its Fourier transform F satisfies the following condition for all values of $\omega$:

$$|F(\omega)|^2 + |F(\omega + \pi)|^2 = 1$$

Two filters with Fourier transforms G and H satisfy the exact reconstruction condition if:

$$|G(\omega)|^2 + |H(\omega)|^2 = 1$$

Filters satisfying these exact reconstruction conditions, also referred to as perfect reconstruction conditions, are well known in the wavelet transform art. A pair of filters satisfying the second exact reconstruction condition above is referred to as a complementary pair.

To filter a one-dimensional image x by a filter f means to obtain a new one-dimensional image y with the following pixel intensities:

$$y(i) = \sum_k x(i+k) \cdot f(k)$$

This operation is equivalent to the conventional convolution operation using the conjugate filter f*.

$$y(i) = \sum_k x(i-k) \cdot f^*(k)$$

The difference between convolution and filtering, as the term is used herein, is purely one of notation. The meaning of the following description and claims would be unchanged if the terms "convolution" and "convolving" were used throughout, instead of "filtering."

To filter a digitized image x horizontally by a filter f means to obtain a new image y as follows:

$$y(i, j) = \sum_k x(i+k, j) \cdot f(k)$$

Similarly, filtering an image x vertically by f means:

$$y(i, j) = \sum_k x(i, j+k) \cdot f(k)$$

Filtering can be done two-dimensionally by, for example, filtering first in the horizontal direction, then in the vertical direction, or vice versa.

A high-pass filter is a filter that retains small-scale variations and rejects large-scale variations. A low-pass filter rejects small-scale variations and retains large-scale variations. Smoothing filter is a synonym for low-pass filter.

The cut-off frequency of a high-pass or low-pass filter indicates the scale that divides the retained variations from the rejected variations. A lower cut-off frequency corresponds to a larger scale of variations. Frequency actually refers to the variable $\omega$ in the Fourier transform $F(\omega)$ of the filter.

Generally speaking, the Fourier transform of a high-pass filter satisfies $F(0)=0$, while for a low-pass filter, $|F(0)|>0$. If $|F(0)|=1$, a low-pass filter can retain large-scale variations without changing their size. Incidentally, $F(0)$ is the sum of the filter coefficients $f(k)$.

First Embodiment

Referring to FIG. 1, the digital image encoder in the first embodiment comprises an input terminal 10, a two-dimensional smoothing and down-sampling section 20, and an edge detector 21. The two-dimensional smoothing and down-sampling section 20 comprises a cascaded series of two-dimensional smoothing filters 22-m (m=1 to n, where n is an integer greater than one), and a down sampler 23. The digital image encoder also comprises an edge image encoder 24, a reduced image encoder 25, and a multiplexer 26, which together constitute an encoding section 27.

A digitized image $X_0$ is input from the input terminal 10 to the edge detector 21 and first smoothing filter 22-1. Smoothing filter 22-1 outputs a filtered image $X_1$ to the next smoothing filter 22-2, and this process continues, each smoothing filter 22-m filtering the image $X_{m-1}$ received from the preceding smoothing filter and furnishing a new filtered image $X_m$ to the next smoothing filter, until the last smoothing filter 22-n is reached. The last smoothing filter 22-n outputs a low-frequency image $X_n$ to the down sampler 23, which outputs a reduced image R to the reduced image encoder 25. The reduced image encoder 25 encodes the reduced image R to obtain reduced image information Cr.

The edge detector 21 detects edge points in the input, image $X_0$ and outputs horizontal and vertical edge images Sh and Sv to the edge image encoder 24 in the encoding section 22. The edge image encoder 24 encodes these edge images to obtain edge image information Cs. The multiplexer 26 combines the reduced image information Cr and edge image information Cs into an encoded image C, which is output to a first input/output device 28 such as a communication channel, semiconductor memory, or magnetic disk storage device.

Figure 2:
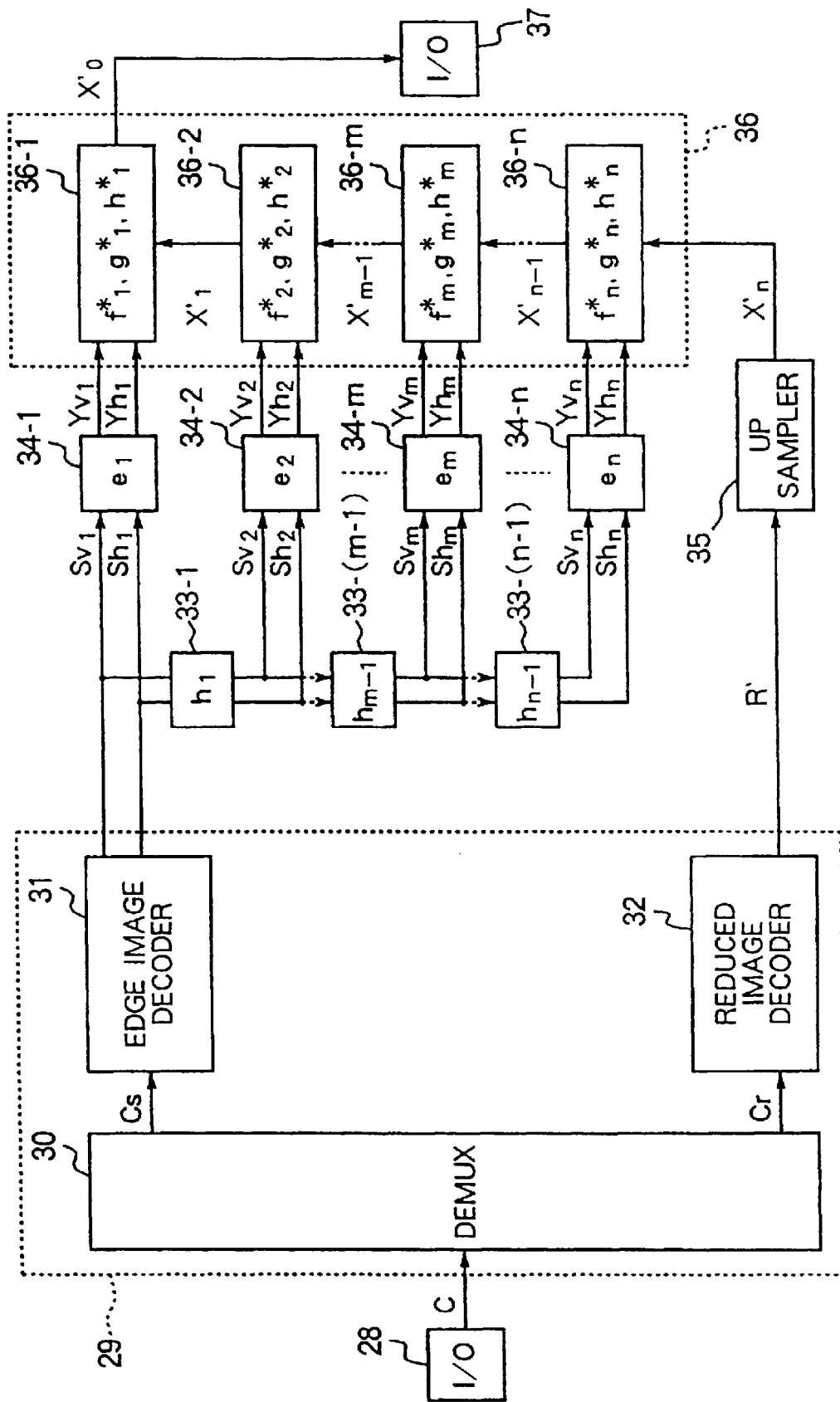
FIG. 2 is a block diagram of the digital image decoder in the first embodiment.

Referring to FIG. 2, the digital image decoder has a decoding section 29 comprising a demultiplexer 30, an edge image decoder 31, and a reduced image decoder 32. The digital image decoder also has a cascaded series of two-dimensional smoothing filters 33-m (m=1 to n−1), a series of edge synthesizers 34-m (m=1 to n), an up sampler 35, and an inverse wavelet transform processor 36. The inverse wavelet transform processor 36 comprises a cascaded series of inverse wavelet processors 36-m (m=1 to n).

The demultiplexer 30 receives the encoded image C from the first input/output device 28 and separates it into edge image information Cs, which it supplies to the edge image decoder 31, and reduced image information Cr, which it supplies to the reduced image decoder 32. The edge image decoder 31 decodes Cs to obtain a pair of horizontal and vertical edge images $Sh_1$ and $Sv_1$. These decoded edge images are filtered in turn by the smoothing filters 33-m (m=1 to n−1), producing a series of pairs of edge images $Sh_m$ and $Sv_m$ (m=1 to n) in which the unfiltered edge images $Sh_1$ and $Sv_1$ are the first pair.

Each edge synthesizer 34-m receives the corresponding pair of edge images $Sh_m$ and $Sv_m$, and synthesizes a pair of horizontal and vertical high-frequency images $Yh_m$ and $Yv_m$ (m=1 to n). The reduced image decoder 32 decodes Cr to obtain a decoded reduced image R', which the up sampler 35 enlarges to obtain a decoded low-frequency image $X'_n$.

In the inverse wavelet transform processor 36, each inverse wavelet processor 36-m (m=1 to n) receives the corresponding high-frequency images $Yh_m$ and $Yv_m$ and a partially reconstructed image $X'_m$ from the preceding inverse wavelet processor 36-(m+1) in the cascade, and outputs a partially reconstructed image $X'_{m-1}$ to the next inverse wavelet processor 36-(m−1). The first inverse wavelet processor 36-n in the cascade receives the decoded low-frequency image $X'_n$ from the up sampler 35. The last inverse wavelet processor 36-1 outputs the fully reconstructed image $X'_0$ to a second input/output device 37.

Each of the elements in the FIGS. 1 and 2 comprises a memory for storing data and well-known circuits for performing arithmetic and logic operations. Descriptions of the circuit configurations will be omitted to avoid obscuring the invention with irrelevant detail. The entire digital image encoder can be fabricated as a single semiconductor integrated circuit, or can be built from a small number of such circuits; likewise the digital image decoder. The invention can also be practiced by providing a general-purpose processor such as a microprocessor or digital signal processor with memory for storing data and programs for executing the functions of the individual elements in FIG. 1 or FIG. 2.

Next the operation will be described, starting with the operation of the encoder in FIG. 1.

The input image $X_0$ is a digitized image with pixel values $X_0$ (i, j). The edge detector 21 detects edges by detecting variations in the rate of change of pixel values from pixel to pixel. More specifically, the edge detector 21 takes differences between adjacent pixel values, then takes differences between these differences, and finally performs a thresholding operation to reduce small differences to zero. This process is carried out separately in the horizontal and vertical directions.

In the horizontal direction, for each pixel, the edge detector 21 computes the following pixel difference Pdh(i, j):

$$Pdh(i, j)=X_0(i, j)-X_0(i-1, j)$$

Next it computes differences Sh(i, j) of these pixel differences Pdh(i, j) as follows:

$$Sh(i, j)=Pdh(i+1, j)-Pdh(i, j)=X_0(i+1, j)-2X_0(i, j)+X_0(i-1, j)$$

Equivalent edge detection could be performed by filtering the image $X_0$ with a second-derivative filter having coefficients (1, −2, 1), but taking differences of differences is preferable because it requires less computation.

The detected value Sh(i, j) is the edge sharpness at pixel (i, j), also referred to as the edge size. Edge sharpness values with absolute values equal to or less than a certain threshold value T are quantized to zero. Values exceeding T are also quantized, to reduce the number of bits in the edge-image data; then the quantized sharpness values Sh(i, j) at all pixels are output as the horizontal edge image Sh. Non-zero pixels in the edge image, i.e. pixels at which |Sh(i, j)|>T, are referred to as edge points.

Figure 3:
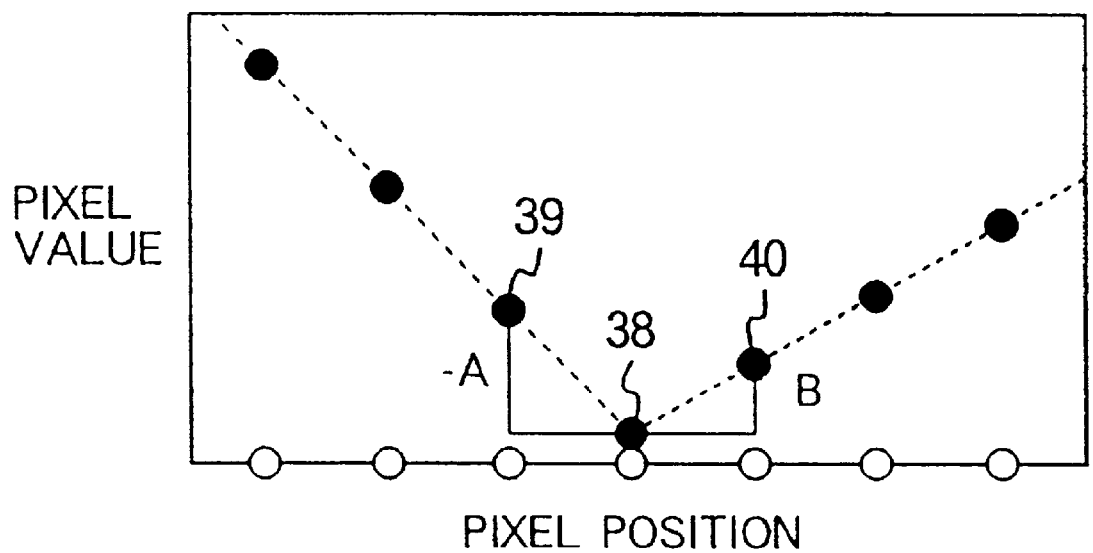
FIG. 3 is a graph illustrating pixel values at an edge.

The meaning of the edge sharpness computation can be seen in FIG. 3. The horizontal axis represents, for example, the horizontal direction in the image, and the vertical axis represents the pixel value. The difference between pixel values 38 and 39 is −A, the difference between pixel values 40 and 38 is B, and the difference between these differences is B−(−A)=A+B. If A+B>T, then pixel 38 is an edge point with sharpness A+B. The other pixels in FIG. 3 have zero sharpness. FIG. 3 thus illustrates a standard edge, with just one sharp variation.

The vertical edge image is generated in the same way, by taking differences in the vertical direction, then taking differences of these differences. The edge sharpness Sv in the vertical direction is:

$$Sv(i, j)=X_0(i, j+1)-2X_0(i, j)+X_0(i, j-1)$$

The vertical edge image is quantized as was the horizontal edge image, points for which |Sv(i, j)|≦T being set to zero. Quantization can be performed by dividing the edge sharpness values by a power of two, for example, or by using a quantization table. Incidentally, the same notation Sh and Sv will be employed herein to denote edge sharpness values both before and after quantization.

Smoothing filter 22-1 employs a low-pass filter $h_1$ with even symmetry and a certain number of taps. In the following description it will be assumed that this filter either has 2N+1 taps and is symmetric around zero, or has 2N taps and is symmetric around ½, where N is an appropriate positive integer. The even symmetry condition in the first case is:

$$h_1(-k)=h_1(k) \ (k=1, 2, \ldots, N)$$

The even symmetry condition in the second case is:

$$h_1(1-k)=h_1(k) \ (k=1, 2, \ldots, N)$$

The low-pass filter $h_1$ satisfies the exact reconstruction condition, and the sum of its tap coefficients is plus or minus one. That is, the Fourier transform $H_1$ of $h_1$ satisfies the following conditions:

$$|H_1(\omega)|^2+|H_1(\omega+\pi)|^2=1 |H_1(0)|=1$$

The smoothing filter 22-1 performs a two-dimensional low-pass filtering operation by filtering the input image $X_0$ with $h_1$ horizontally and vertically, obtaining:

$$X_1(i, j) = \sum_k \sum_l X_0(i+k, j+l) \cdot h_1(k) \cdot h_1(l)$$

The other smoothing filters 22-m (m>1) also employ low-pass filters $h_m$ with even symmetry, and with tap coefficients summing to plus or minus one. The cut-off frequency of each smoothing filter 22-m (m>1) is one-half the cut-off frequency of the preceding filter 22-(m−1) in the cascade. Filters with these cut-off frequencies can be obtained by doubling the tap spacing from one filter to the next, and inserting zeros to fill the vacated spaces. If the number of taps is odd, for example, then $h_m$ can be obtained from $h_{m-1}$ as follows:

$$h_m(2k)=h_{m-1}(k) h_m(2k+1)=0 \ (k=0, \pm 1, \pm 2, \ldots)$$

In smoothing filter 22-m, image $X_{m-1}$ is filtered horizontally and vertically by filter $h_m$ to obtain image $X_m$. As the image passes through the cascade, variations on progressively larger scales are smoothed out, and resolution of fine detail decreases correspondingly.

Incidentally, if the low-pass filters $h_m$ (m>1) are obtained by doubling the tap spacing as described above, they will pass high-frequency variations in certain regions above their cut-off frequencies. This is allowable because those high-frequency variations will already have been removed by previous filters in the cascade.

The down sampler 23 down-samples the low-frequency image $X_n$ output by the smoothing filter 22-n, thereby reducing the amount of image data. One simple method of down-sampling is to divide the image into blocks of M×M pixels each, and replace each block by a representative pixel value such as the mean or median value in the block. This reduces the size of the image by a factor of M in both the horizontal and vertical directions, and reduces the amount of image data by a factor of $M^2$. (M is an appropriate integer, such as $M=2^n$.) The reduced image R output by the down sampler 23 resembles a photographic reduction of the original image $X_0$.

The edge image encoder 24 encodes the quantized horizontal and vertical edge images Sh and Sv by using, for example, run-length encoding to encode the positions of edge points, and differential encoding to encode the sharpness values at these points. Alternatively, chain encoding can be used to encode the edge positions, taking advantage of the fact that edge points tend to be organized into chains of mutually contiguous points. Chain encoding encodes only the displacement from one position to the next in such a chain.

The reduced image encoder 25 encodes the reduced image R by, for example, performing a discrete cosine transform, quantizing the resulting DCT coefficients, and encoding them in zig-zag order by a variable-length encoding method.

Alternatively, the reduced image R can be encoded by a predictive encoding method similar to the differential pulse-code modulation method (DPCM) commonly employed for audio signals, or by any other suitable method. If the above value of M is sufficiently large, high coding efficiency is not critically important, because the amount of data to be encoded has already been greatly reduced by down-sampling.

The encoded image C, consisting of the edge image information Cs and low-frequency information Cr as multiplexed by the multiplexer 26, is output to the first input/output device 28 for transmission or storage. The amount of encoded data is generally reduced to a small fraction of the amount in the original image $X_0$, so the encoded image C can be efficiently transmitted or stored.

Next the decoding operations will be described. These operations employ further filters $e_m$, $f_m$, and $g_m$.

Filter $g_1$ is a high-pass filter related to the smoothing filter $h_1$ as follows:

$$g_1(k) = (-1)^k h_1(-k)$$

This relation implies that $g_1$ has even symmetry if $h_1$ was symmetric around zero, or odd symmetry if $h_1$ was symmetric around ½. It further implies that the Fourier transform $G_1$ of $g_1$ is the complex conjugate of $H_1(\omega+\pi)$, so in particular, $h_1$ and $g_1$ satisfy the exact reconstruction condition and form a complementary pair. Furthermore, $G_1(\omega+\pi)$ is the complex conjugate of $H(\omega)$, so $g_1$ also satisfies an exact reconstruction condition by itself:

$$|H_1(\omega)|^2 + |G_1(\omega)|^2 = 1 |G_1(\omega)|^2 + |G_1(\omega+\pi)|^2 = 1$$

Since $|H_1(0)|=1$, it follows that $|G_1(0)|=0$, so the sum of the tap coefficients $g_1(k)$ is zero.

The other filters $g_m$ (m=2 to n) are also high-pass filters, and are related to the corresponding $h_m$ by a similar equation:

$$|H_m(\omega)|^2 + |G_m(\omega)|^2 = 1$$

These filters $g_m$ can be obtained from $g_1$ by successively doubling the tap spacing, in the same way that the filters $h_m$ were obtained from $h_1$.

Filter $f_m$ is a completion filter, defined in terms of its Fourier transform $F_m$ as follows.

$$F_m(\omega) = \frac{1 + |H_m(\omega)|^2}{2}$$

Filter $f_m$ is a low-pass filter, referred to as a completion filter, obtained by executing an inverse Fourier transform on $F_m$. Once $f_1$ has been obtained, the other $f_m$ (m=2 to n) can be derived from it by successively doubling the tap spacing. The above definition of $F_m$, incidentally, is well known in the wavelet transform art and comes from the following equation:

$$|H(\omega)|^4 + 2 \cdot F(\omega) \cdot |G(\omega)|^2 = 1$$

Filter $e_m$ is an edge synthesis filter derived by filtering a standard edge of unit sharpness by the corresponding high-pass filter $g_m$. When $g_m$ has even symmetry, all standard edges with unit sharpness lead to the same $e_m$, which has the following tap values $e_m(t)$. L is the half-length of $g_m$, i.e. the distance from the central tap to the outermost tap. If $g_m$ is derived as described above, then $L=2^{(m-1)}N$).

$$e_m(t) = e_m(-t) = \sum_{k=t}^{L}(k-t) \cdot g_m(k) \quad \text{if } 0 \leq t < L$$

$$e_m(t) = e_m(-t) = 0 \quad \text{if } t \geq L$$

When $g_m$ has odd symmetry, the situation is a little more complicated and will be described later.

Referring again to FIG. 2, after the demultiplexer 30 separates the input encoded image C into edge image information Cs and reduced image information Cr, decoders 31 and 32 carry out processes that are reverse to the processes performed by encoders 24 and 25 in FIG. 1. For example, if the reduced image encoder 25 in FIG. 1 performed a discrete cosine transform followed by quantization and variable-length encoding, the reduced image decoder 32 in FIG. 2 performs variable-length decoding, dequantization, then an inverse discrete cosine transform to obtain the decoded reduced image R'.

If the edge images were encoded by run-length or chain encoding of the positions of the edge points and differential encoding of their sharpness, the edge image decoder 31 performs run-length or chain decoding to recover the edge positions and an accumulation process to obtain the sharpness values. The edge image decoder 31 also dequantizes the sharpness values.

The up sampler 35 obtains the decoded low-frequency image $X'_n$ by restoring the decoded reduced image R' to the original image size (the size of the edge images and high-frequency images). If, for example, each pixel value in the reduced image R represented an M×M block in the low-frequency image $X_n$, the up sampler 35 can simply copy this value to all pixels in the corresponding M×M block of the decoded low-frequency image $X'_1$. More sophisticated up-sampling methods involving interpolation can also be employed, but smooth interpolation is not required, because the image will be smoothed during the inverse wavelet transform.

The cascaded smoothing filters 33-m (m=1 to n−1) carry out successive two-dimensional filtering operations on the pairs of edge images $Sh_m$ and $Sv_m$ in the same way that the cascaded smoothing filters 22-m carried out successive filtering operations in the encoder. Specifically, $Sh_m$ is filtered by $h_m$ horizontally and vertically to obtain $Sh_{m+1}$, and $Sv_m$ is filtered by $h_m$ horizontally and vertically to obtain $Sv_{m+1}$.

Each edge synthesizer 34-m filters the corresponding horizontal edge image $Sh_m$ by the edge synthesis filter $e_m$ in the horizontal direction, and the vertical edge image $Sv_m$ by $e_m$ in the vertical direction. When the smoothing filters $h_m$ have an odd number of taps and the high-pass filters $g_m$ accordingly have even symmetry, the resulting horizontal and vertical high-frequency images $Yh_m$ and $Yv_m$ can be described by the following equations:

$$Yh_m(i,j) = \sum_t Sh_m(i+t, j) \cdot e_m(t)$$

$$Yv_m(i,j) = \sum_t Sv_m(i, j+t) \cdot e_m(t)$$

Conceptually, for each edge point, the edge synthesizer 34 synthesizes the result of filtering a standard edge of the corresponding sharpness by the high-frequency filter $g_m$. It then adds these results together for all edge points to synthesize a high-frequency image.

When the smoothing filters $h_m$ have an even number of taps and the high-pass filters $g_m$ accordingly have odd symmetry, it is advantageous to carry out the edge synthesis indirectly. One reason is that in this case, the results of filtering different standard edges by the same $g_m$ need not be the same. Another reason is that the resulting edge synthesis filters $e_m$ can have an unlimited number of non-zero taps.

If the differences $de_m(t)$ between adjacent coefficient values in $e_m$ are taken, however, these differences have the desirable properties of depending only on the edge sharpness, and being zero except in a limited domain. These differences are given by the following equation, in which L has the same meaning as before ($L=2^{m-1}N$). They represent the result of filtering a standard edge of unit sharpness with the high-pass filter $g_m$, then taking differences between the resulting values at adjacent pixels.

$$de_m(t) = de_m(-t) = \sum_{k=t}^{L} g_m(k) \quad \text{if } 0 \le t \le L$$

$$de_m(t) = de_m(-t) = 0 \quad \text{if } t \ge L$$

The horizontal edge image $Sh_m$ is first filtered horizontally by $de_m(t)$ to obtain a horizontal differential high-frequency image $\Delta Yh$, and the vertical edge image $Sv_m$ is filtered vertically with $de(t)$ to obtain a vertical differential high-frequency image $\Delta Yv$. These differential high-frequency images are described by the following equations:

$$\Delta Yh_m(i, j) = \sum_{t} Sh_m(i+t, j) \cdot de_m(t)$$

$$\Delta Yv_m(i, j) = \sum_{t} Sv_m(i, j+t) \cdot de_m(t)$$

The horizontal and vertical differential high-frequency images are then cumulatively summed to obtain the horizontal and vertical high-frequency images $Yh_m$ and $Yv_m$. If the horizontal and vertical coordinates i and j both start at zero, these accumulation operations can be described as follows:

$$Yh_m(0, j) = \Delta Yh_m(0, j)$$

$$Yh_m(i, j) = \Delta Yh_m(i, j) + Yh_m(i-1, j) \quad (i > 0)$$

$$Yv_m(i, 0) = \Delta Yv_m(i, 0)$$

$$Yv_m(i, j) = \Delta Yv_m(i, j) + Yv_m(i, j-1) \quad (j > 0)$$

In the inverse wavelet transform processor 36, each inverse wavelet processor 36-m performs three two-dimensional filtering operations, using the conjugate filters $f^*_m$, $g^*_m$, and $h^*_m$ of $f_m$, $g_m$, and $h_m$. The image $X'_m$ is filtered by $h^*_m$ horizontally and vertically, the horizontal high-frequency image $Yh^*_m$ is filtered by $g^*_m$ horizontally and $f^*_m$ vertically, and the vertical high-frequency image $Yv_m$ is filtered by $g^*_m$ vertically and $f^*_m$ horizontally. The three results are added to obtain the partially reconstructed image $X'_{m-1}$. This inverse wavelet transform is well known in the art, and is described by the following equation:

$$X'_{m-1}(i, j) = \sum_{k}\sum_{l} X'_m(i+k, j+l) \cdot h^*_m(k) \cdot h^*_m(l) +$$

-continued
$$\sum_{k}\sum_{l} Yh_m(i+k, j+l) \cdot g^*_m(k) \cdot f^*_m(l) +$$

$$\sum_{k}\sum_{l} Yv_m(i+k, j+l) \cdot f^*_m(k) \cdot g^*_m(l)$$

The reconstructed image $X'_0$ is output to the second input/output device 37 for display or print-out. Alternatively, the reconstructed image can be output to a computer for further image processing.

Synthesizing high-frequency image information from edge images as described above enables high compression ratios to be obtained. High-frequency information corresponding to edges below the sharpness threshold T is lost, so there is some loss of low-level, high-frequency shading variations, but the reconstructed image is not distorted, and sharp edges are faithfully preserved.

One feature of the invented encoder is that edge detection is performed only at the original image scale, which permits edge detection to proceed concurrently with the smoothing filtering and down-sampling operations in the encoder, to speed up the encoding process. Another feature is that in the decoder, high-frequency images are synthesized in a single step at each wavelet scale, without recourse to iterative procedures. This reduces the computational load in the decoder, speeds up the decoding process, and eliminates the prior-art problem of deciding when to stop iterating.

Second Embodiment

The second embodiment is similar to the first, but incorporates a down-sampling process into each of the smoothing filters in the encoder and decoder, and an up-sampling process into each of the inverse wavelet processors in the decoder.

Figure 4:
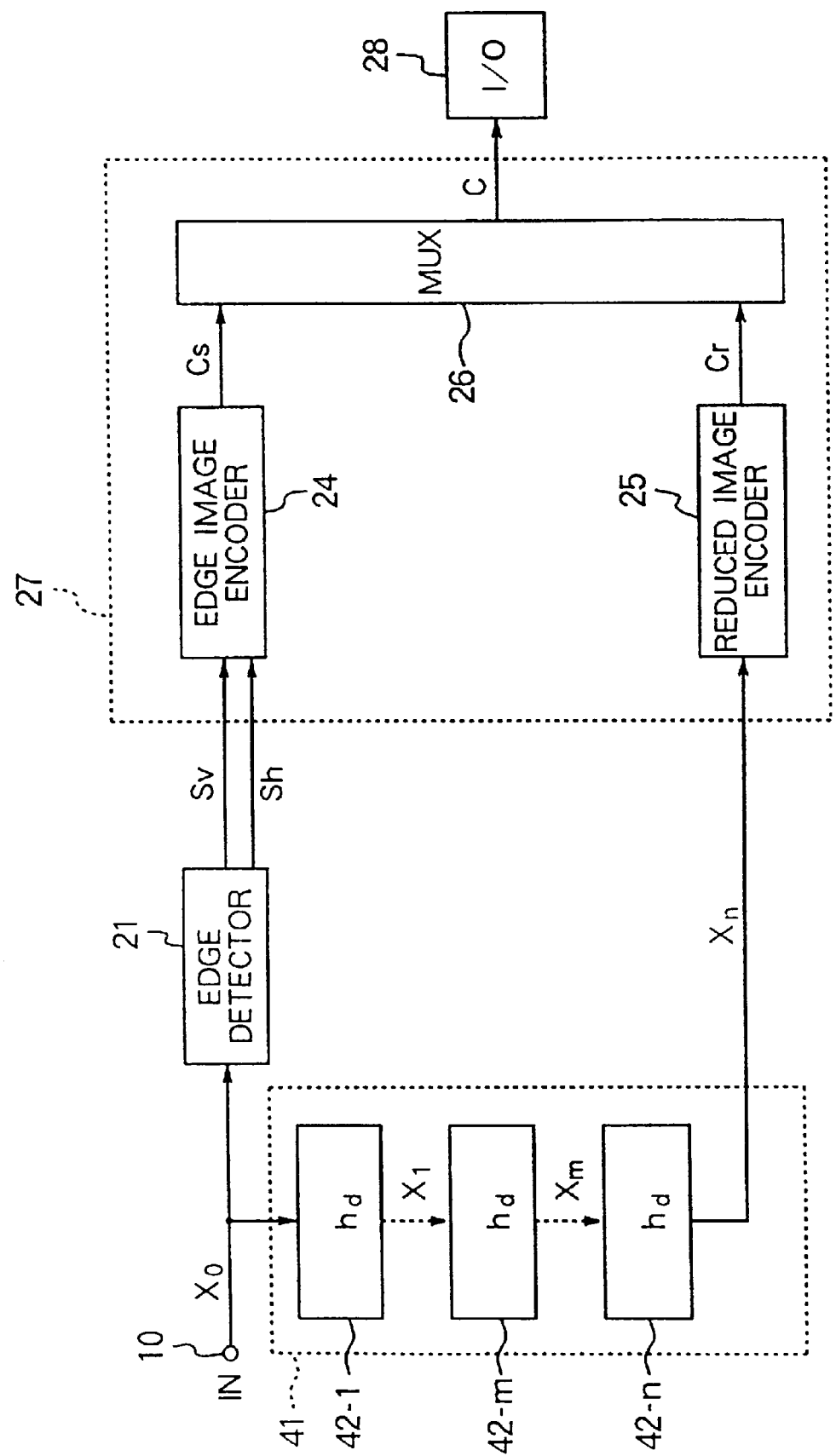
FIG. 4 is a block diagram of the digital image encoder in a second embodiment of the invention.

Referring to FIG. 4, the digital image encoder in the third embodiment has the same edge detector 21 and encoding section 27 as in the first embodiment, but its two-dimensional smoothing and down-sampling section 41 employs smoothing and down-sampling filters 42-m (m=1 to n). In addition to low-pass filtering, these cascaded filters 42-m down-sample the filtered data by discarding every other pixel in both the horizontal and vertical directions.

Figure 5:
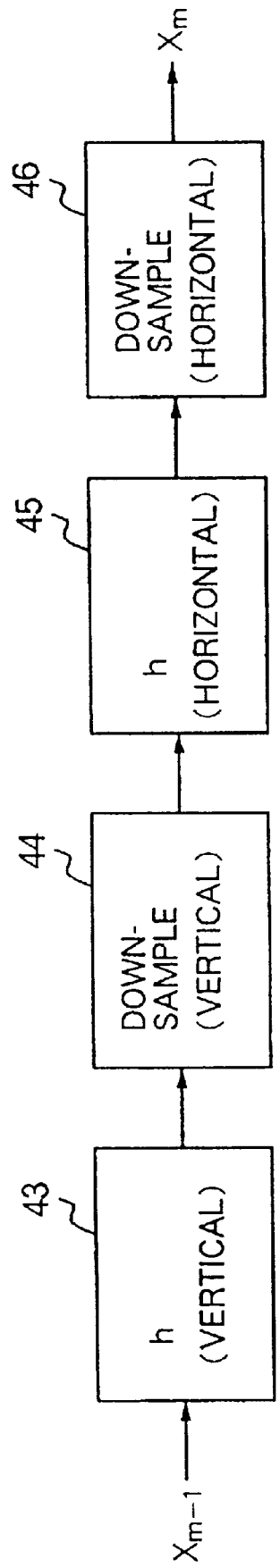
FIG. 5 is flow diagram illustrating the smoothing and down-sampling process in the encoder of the second embodiment.

FIG. 5 shows a conceptual flow diagram of the smoothing and down-sampling filtering process. The first step 43 is a vertical smoothing step carried out using a low-pass filter h identical to filter $h_1$ in the first embodiment. The second step 44 is a vertical down-sampling step that discards every other pixel in the vertical direction. The third step 45 is a horizontal smoothing step in which the remaining image data are filtered by the same filter h in the horizontal direction. The fourth step 46 is a horizontal down-sampling step that discards every other pixel in the horizontal direction.

Needless to say, the values of pixels that will be discarded immediately following a filtering operation do not have to be computed in that filtering operation. The entire operation performed by the two-dimensional smoothing and down-sampling filter 42-m can therefore be described by the following equation:

$$X_m(i, j) = \sum_{k}\sum_{l} X_{m-1}(2i+k, 2j+l) \cdot h(k) \cdot h(l)$$

This operation reduces the size of the image by a factor of two in both the horizontal and vertical directions. The same low-pass filter h is used in all the filters 42-m (m=1 to n). It is not necessary to double the tap spacing by inserting zero coefficients at successive wavelet scales as in the first embodiment.

In the drawings, the symbol $h_d$ denotes filtering by h followed by down-sampling as described above.

Figure 6:
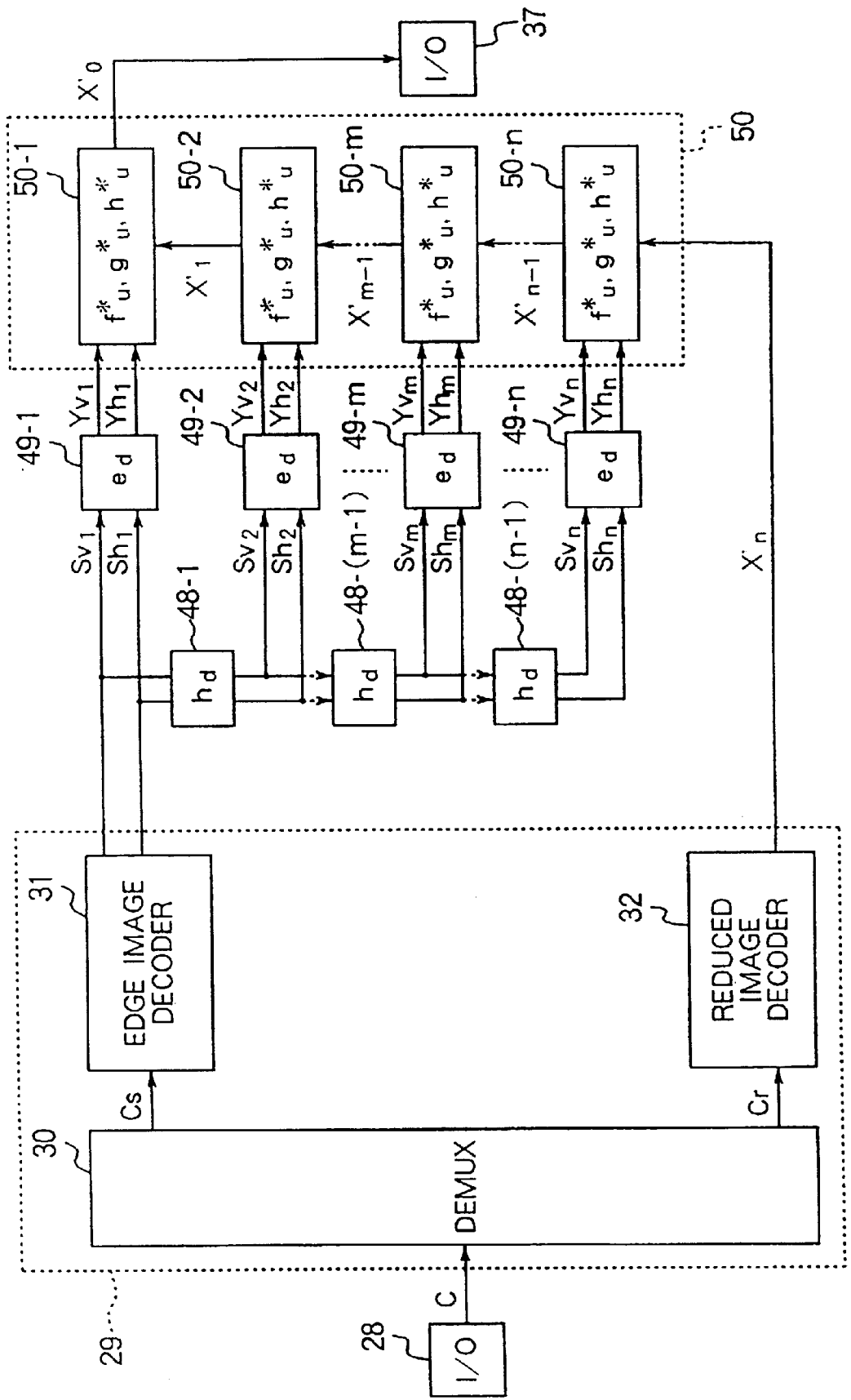
FIG. 6 is a block diagram of the digital image decoder in the second embodiment.

FIG. 6 shows the digital image decoder of the second embodiment. The decoding section 29 is the same as in the first embodiment. The output of the reduced image decoder 32 is now denoted $X'_n$, but is similar to the output R in the first embodiment. The decoder employs fitters e, f, g, and h that are identical to $e_1$, $f_1$, $g_1$, and $h_1$ in the first embodiment. The subscripts d and u attached to these filters denote associated down-sampling and up-sampling operations, respectively.

The edge images $Sv_1$ and $Sh_1$ output by the edge image decoder 31 are filtered by a cascade of smoothing and down-sampling filters 48-m (m=1 to n−1) identical to the smoothing and down-sampling filters 42-m in the encoder. Each filter 48-m filters and smooths each input edge image $Sv_m$ and $Sh_m$ in both the vertical and horizontal directions, and down-samples the result by a factor of two in both directions to generate edge images $Sv_{m+1}$ and $Sh_{m+1}$. Due to the down-sampling, $Sv_{m+1}$ is only half as wide and half as high as $Sv_m$, and $Sh_{m+1}$ is only half as wide and half as high as $Sh_m$.

Figure 7:
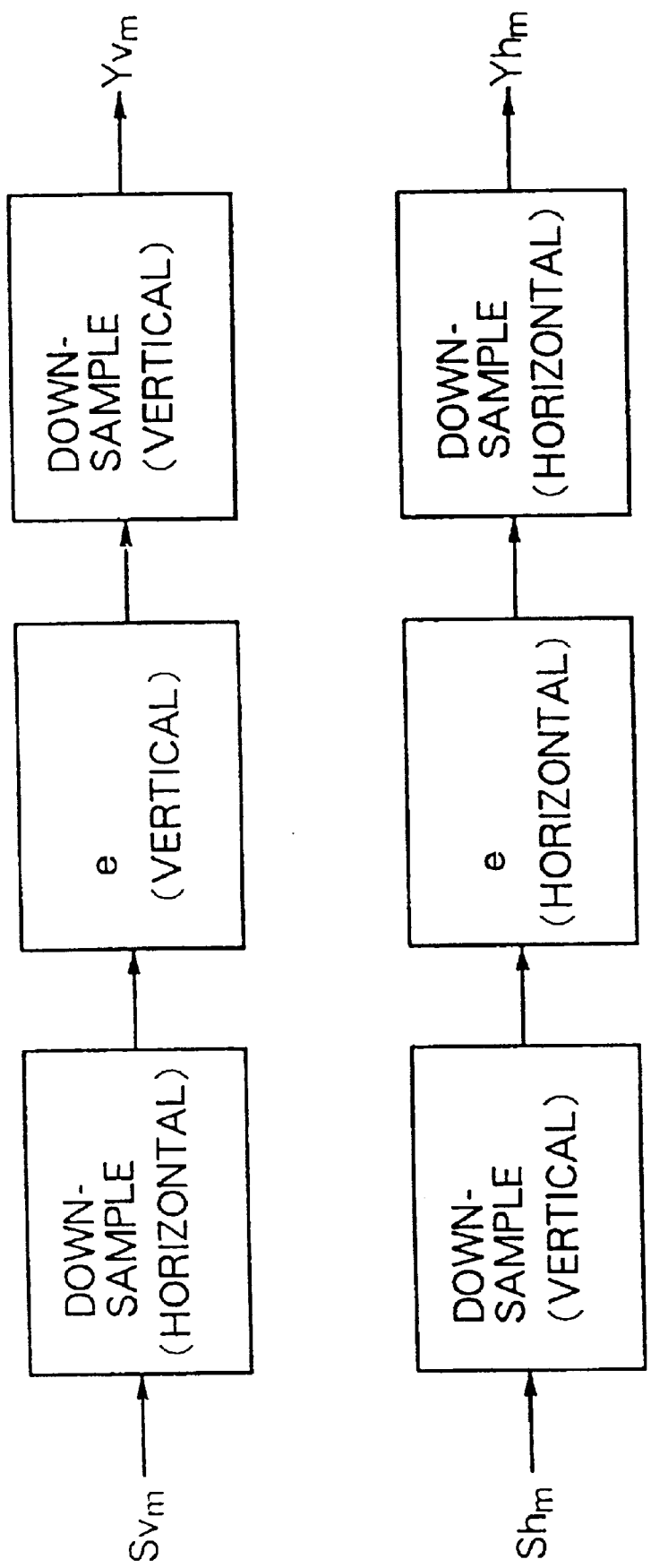
FIG. 7 is a flow diagram illustrating the synthesis of high-frequency images in the second embodiment.

The decoded edge images $Sv_m$ and $Sh_m$ are input to an edge synthesizer 49-m (m=1 to n). There, the vertical edge image $Sv_m$ is down-sampled by a factor of two in the horizontal direction, filtered by the above-mentioned filter e in the vertical direction, then down-sampled by a factor of two in the vertical direction, while the horizontal edge image $Sh_m$ is down-sampled by a factor of two in the vertical direction, filtered by filter e in the horizontal direction, then down-sampled by a factor of two in the horizontal direction. These operations are depicted conceptually in FIG. 7. The resulting high-frequency images will be denoted $Yh_m$ and $Yv_m$ as in the first embodiment.

The high-frequency images $Yh_m$ and $Yv_m$ (m=1 to n) and the low-frequency reduced image $X'_n$ are input to an inverse wavelet transform processor 50 comprising cascaded inverse wavelet processors 50-m (m=1 to n). Processors 50-m use the conjugate filters f*, g*, and h* to perform the same computation as in the first embodiment, but each filtering step in the computation is preceded by an up-sampling step. These up-sampling steps double the image size by inserting zero-valued pixels between every pair of adjacent pixels in the appropriate direction. To prevent the zero-valued pixels from reducing the mean value of the output image, after each filtering step, the resulting pixel values are doubled.

Due to up-sampling, the image $X'_{m-1}$ output from inverse wavelet processor 50-m is twice as wide and twice as high as each of the three images $X'_m$, $Yv_m$, and $Yh_m$ input to processor 50-m. The three input images $X'_m$, $Yv_m$, and $Yh_m$ all have the same size.

Figure 8:
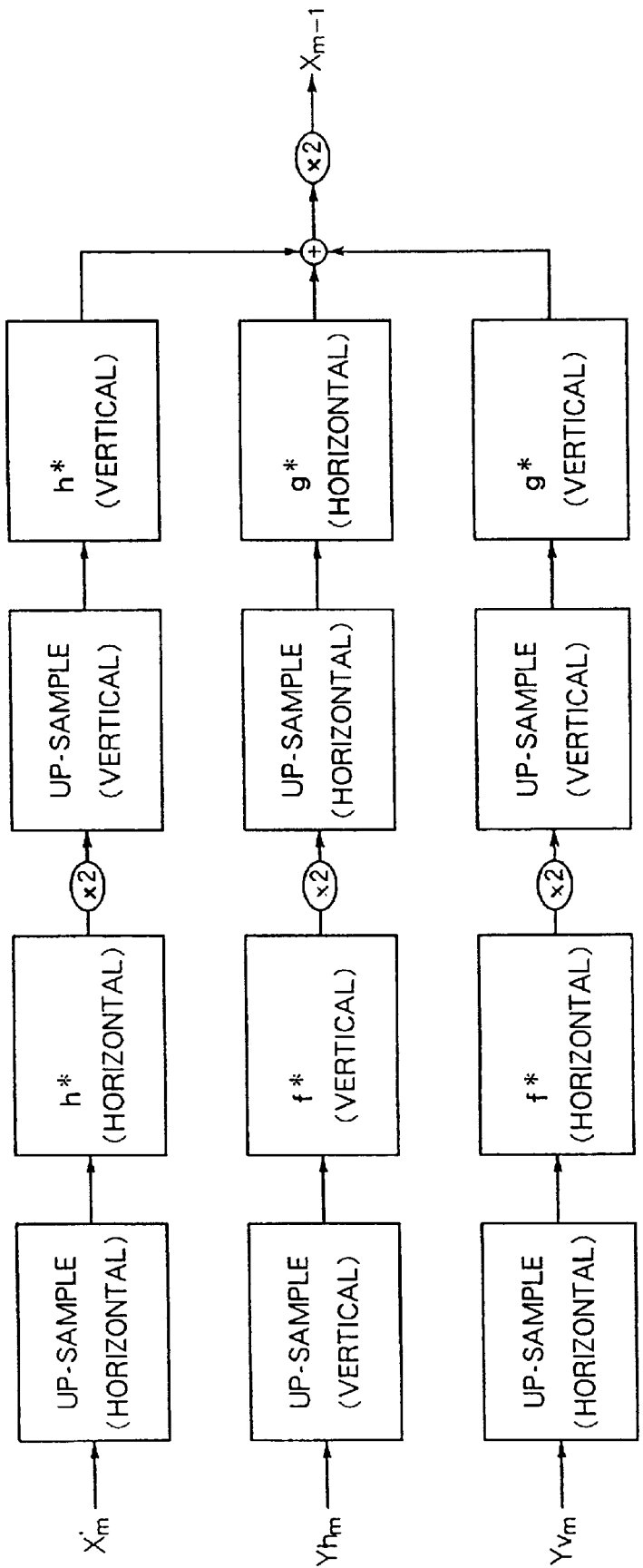
FIG. 8 is a flow diagram illustrating the inverse wavelet transform in the second embodiment.

FIG. 8 depicts the operation performed by the inverse wavelet processor 50-m schematically. As indicated at the top of this drawing, the partially reconstructed image $X'_m$ received from the preceding processor 50-(m+1) in the cascade is up-sampled horizontally by interpolating zeros (reducing the mean pixel value by a factor of two) and filtered horizontally by h*; then the resulting pixel values are doubled (restoring the correct mean value). The image is now up-sampled vertically, again by interpolating zeros, and filtered by h* vertically. Similarly, high-frequency image $Yh_m$ is up-sampled vertically, filtered by f* vertically, doubled in pixel value, up-sampled horizontally, and filtered by g* horizontally. High-frequency image $Yv_m$ is up-sampled horizontally, filtered by f* horizontally, doubled in pixel value, up-sampled vertically, and filtered by g* vertically.

The three resulting images are then added together to produce a sum image, all pixel values in which are again doubled to counteract the effect of the second up-sampling steps. The final result is the partially reconstructed image $X'_{m-1}$ which is passed to the next wavelet processor 50-(m−1), or the reconstructed image $X'_0$ output to the input/output device 37.

The operation performed by inverse wavelet processor 50-m can be described by the following equation. Up-sampling is accomplished by dividing the values of i, j, k, and l by two. If either i/2+k/2 or j/2+l/2 is not an integer, the corresponding values of $X'_m$, $Yh_m$, and $Yv_m$ are taken to be zero.

$$X'_m(i,j) = 4 \Bigg[ \sum_k \sum_l X'_m(i/2+k/2, j/2+l/2) \cdot h^*(k) \cdot h^*(l) + \\ \sum_k \sum_l Yh_m(i/2+k/2, j/2+l/2) \cdot g^*(k) \cdot f^*(l) + \\ \sum_k \sum_l Yv_m(i/2+k/2, j/2+l/2) \cdot f^*(k) \cdot g^*(l) \Bigg]$$

The second embodiment provides the same advantages as the first embodiment but requires less computation, because the amount of image data to be processed is reduced by a factor of four (by a factor of two horizontal and another factor of two vertically) at each wavelet scale. The computational load of the additional up-sampling and down-sampling steps, and of multiplying pixel values by two, is slight.

Third Embodiment

The third embodiment detects edges diagonally as well as horizontally and vertically. To prevent an increase in the amount of encoded data, some of the down-sampling steps that were performed in the decoder in the second embodiment are moved into the encoder.

Figure 9:
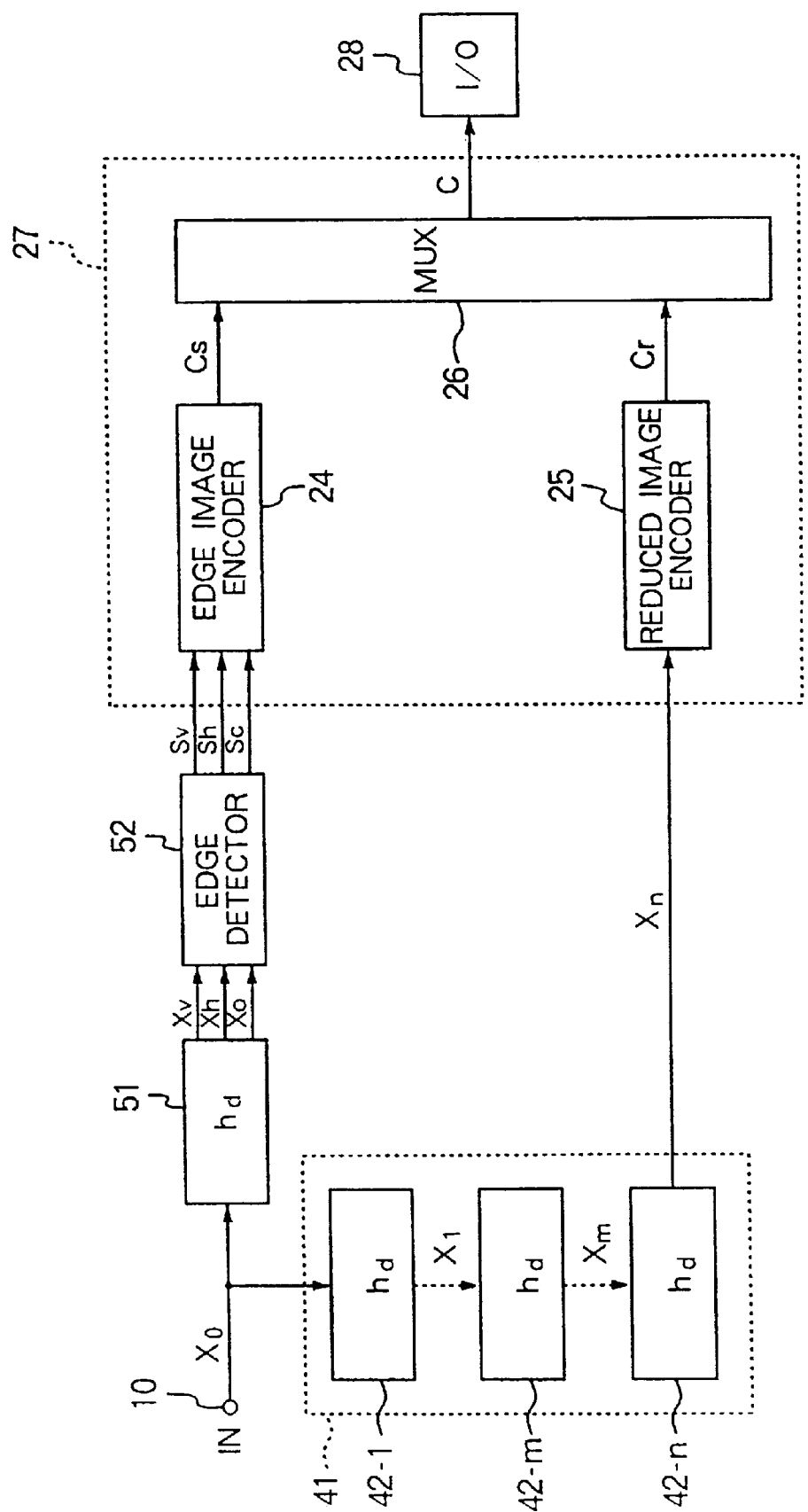
FIG. 9 is a block diagram of the digital image encoder in a third embodiment of the invention.

FIG. 9 is a block diagram of the digital image encoder of the third embodiment. The two-dimensional smoothing and down-sampling section 41 is the same as in the second embodiment. The original image $X_0$ is also input to a one-dimensional smoothing and down-sampling section 51, which outputs the original image $X_0$ together with a vertically smoothed and down-sampled image Xh and a horizontally smoothed and down-sampled image Xv to an edge detector 52. The edge detector 52 outputs three edge images Sh, Sv, and Se to the encoding section 27, which is the same as in the first two embodiments.

Figure 10:
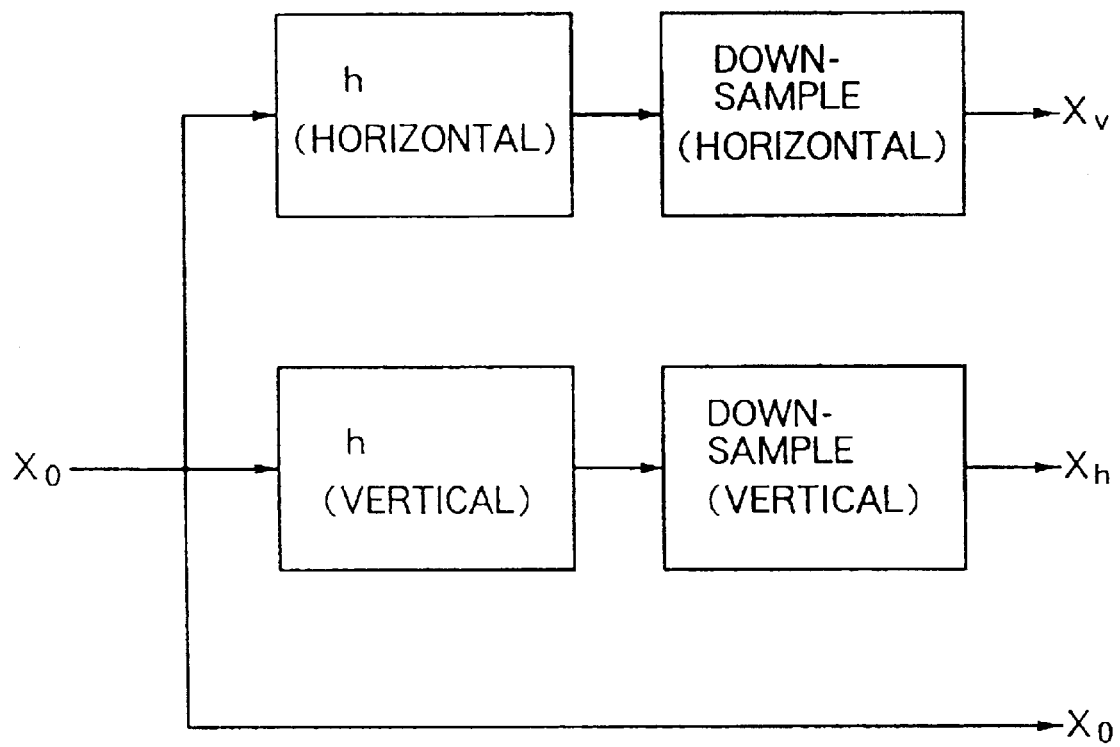
FIG. 10 is a flow diagram illustrating one-dimensional filtering and down-sampling in the third embodiment.

FIG. 10 illustrates the processes carried out in the one-dimensional smoothing and down-sampling section 51. Image Xv is produced by filtering the original image $X_0$ with the low-pass filter h in the horizontal direction, then down-sampling the resulting image by removing every other pixel in the horizontal direction. Image Xv accordingly contains only half as much data as image $X_0$.

Similarly, image Xh is produced by filtering $X_0$ vertically with the low-pass filter h, then down-sampling the result by removing every other pixel in the vertical direction. Image Xh also contains only half as much data as image $X_0$.

Images Xv and Xh can be described by the following equations:

$$Xv(i, j) = \sum_{k} X_0(2i+k, j) \cdot h(k)$$

$$Xh(i, j) = \sum_{k} X_0(i, 2j+k) \cdot h(k)$$

The edge detector 52 detects edges by the method described earlier: by taking differences between adjacent pixels, then taking differences between these differences. This method is applied in the directions that have not been down-sampled. Accordingly, differences are taken horizontally in the vertically down-sampled image Xh, producing a horizontal edge image Sh. Similarly, differences are taken vertically in the horizontally down-sampled image Xv, producing a vertical edge image Sv.

Edges are detected diagonally by processing the original image $X_0$ in both the horizontal and vertical directions. The difference-of-differences operation is first performed on $X_0$ in, for example, the horizontal direction, producing an intermediate image. The difference-of-differences operation is next performed on this intermediate image in the vertical direction. Resulting pixels with absolute values equal to or less than a threshold value T are then set to zero, and other values are suitably quantized, producing a diagonal edge image Sc. Prior to quantization, Sc has the following values:

$$Sc(i, j) = X_0(i-1, j+1) - 2X_0(i-1, j) + X_0(i-1, j-1) -$$
$$2X_0(i, j+1) + 4X_0(i, j) - 2X_0(i, j-1) +$$
$$X_0(i+1, j+1) - 2X_0(i+1, j) + X_0(i+1, j-1)$$

The edge image encoder 24 can encode the diagonal edge image Sc by methods similar to those used for the vertical and horizontal edge images Sv and Sh. Sc has the same size as the original image $X_0$, while Sv and Sh are only half this size, so the total amount of data to be encoded is the same as in the first two embodiments.

Figure 11:
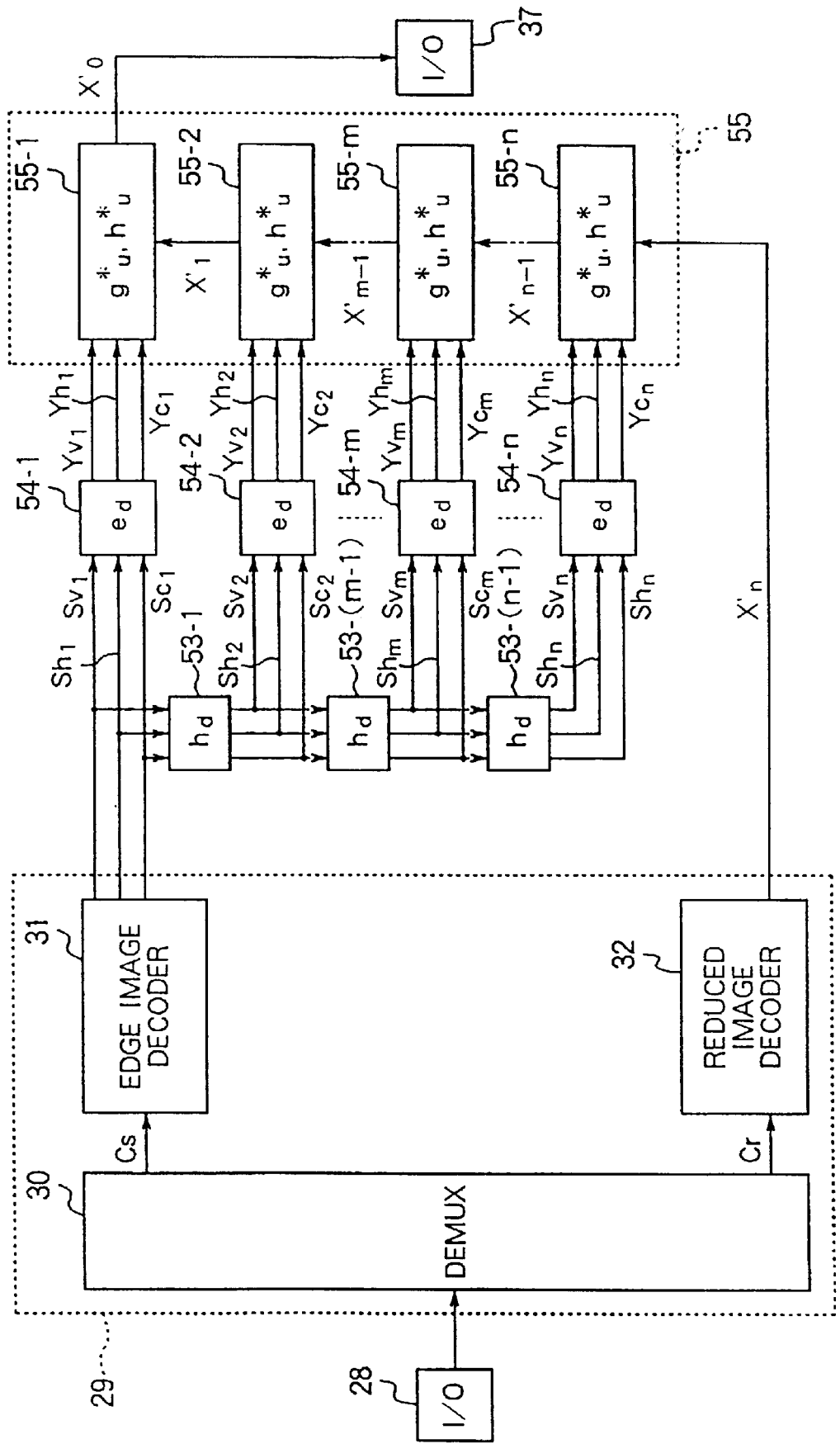
FIG. 11 is a block diagram of the digital image decoder in the third embodiment.

FIG. 11 is a block diagram of the digital image decoder in the third embodiment. The decoding section 29 is the same as in the preceding embodiments, except that the edge image decoder 31 outputs a set of three edge images, $Sv_1$, $Sh_1$, and $Sc_1$, corresponding to the encoded edge images Sv, Sh, and Sc.

These images are input to a cascade of two-dimensional smoothing and down-sampling filters 53-m (m=1 to n−1). These are identical to the two-dimensional smoothing and down-sampling filters 48-m in the second embodiment, except that each filter smooths and down-samples three separate edge images instead of two, producing vertical, horizontal, and diagonal edge images $Sv_{m+1}$, $Sh_{m+1}$, and $Sc_{m+1}$. Each of these edge images $Sv_{m+1}$, $Sh_{m+1}$, and $Sc_{m+1}$ is only half as high and half as wide as the corresponding image $Sv_m$, $Sh_m$, or $Sc_m$ in the preceding set.

These images are processed by corresponding edge synthesizers 54-m as explained below to create sets of vertical, horizontal, and diagonal high-frequency images $Yv_m$, $Yh_m$, and $Yc_m$. These are supplied to an inverse wavelet transform processor 55, comprising cascaded inverse wavelet processors 55-m (m=1 to n), which output reconstructed or partially reconstructed images $X'_{m-1}$.

Figure 12:
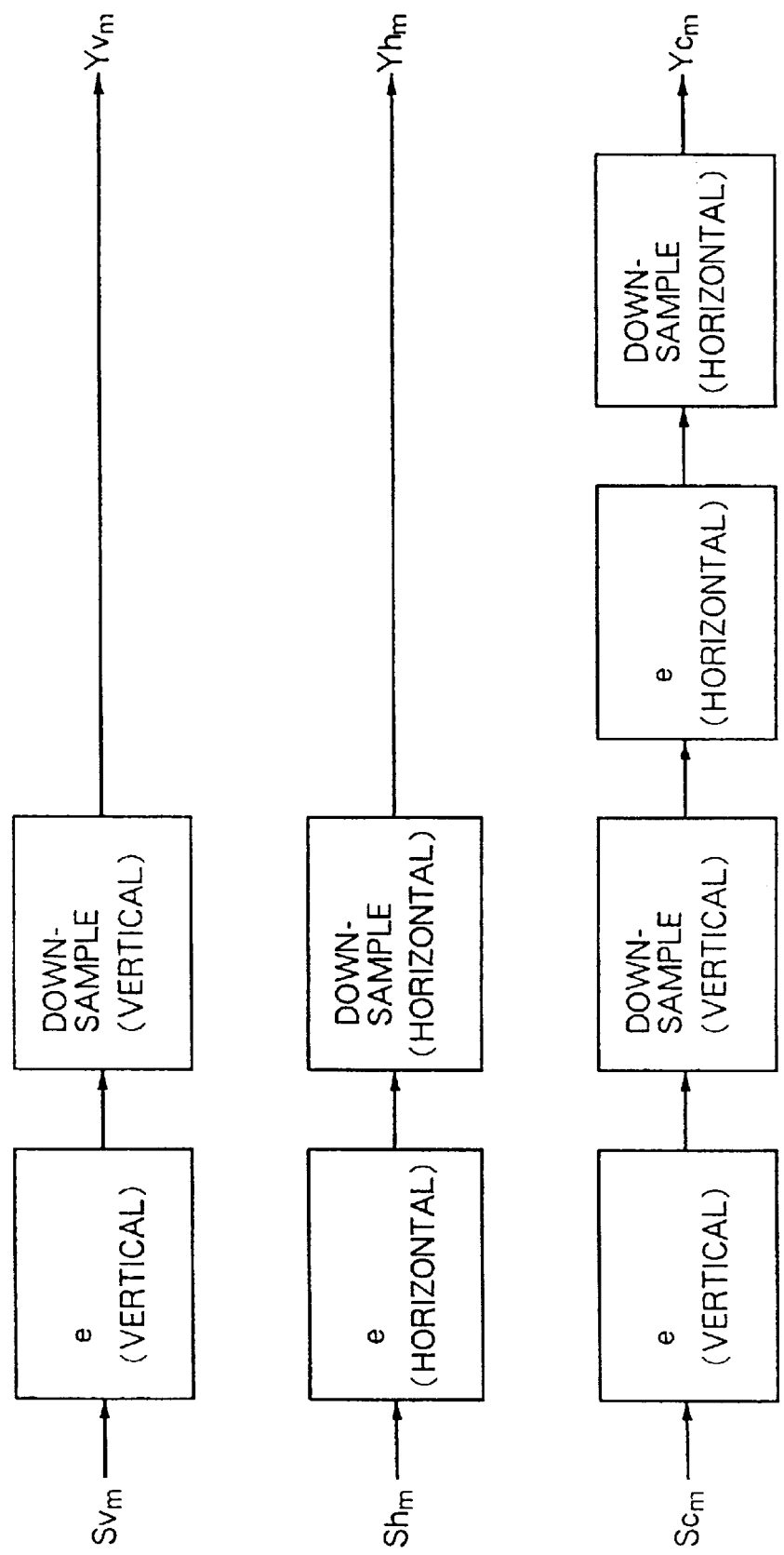
FIG. 12 is a flow diagram illustrating the synthesis of high-frequency images in the third embodiment.

Edge synthesizer 54-m operates as illustrated in FIG. 12, using the same edge synthesis filter e as in the second embodiment. The vertical edge image $Sv_m$ is filtered vertically by e, then down-sampled by removing every other pixel in the vertical direction to create a vertical high-frequency image $Yv_m$. Similarly, the horizontal edge image $Sh_m$ is filtered horizontally by e, then down-sampled horizontally to create a horizontal high-frequency image $Yh_m$. The diagonal edge image $Sc_m$ is filtered vertically by e, down-sampled in the vertical direction, filtered horizontally by e, then down-sampled in the horizontal direction, creating a diagonal high-frequency image $Yc_m$.

Due to the combination of down-sampling in the one-dimensional smoothing and down-sampling section 51 in the encoder and in the edge synthesizer 54-m in the decoder, the three high-frequency images $Yv_m$, $Yh_m$, and $Yc_m$ are all the same size. Each has been down-sampled m times in both the horizontal and vertical directions, reducing the number of pixels by a total factor of $4^m$.

Figure 13:
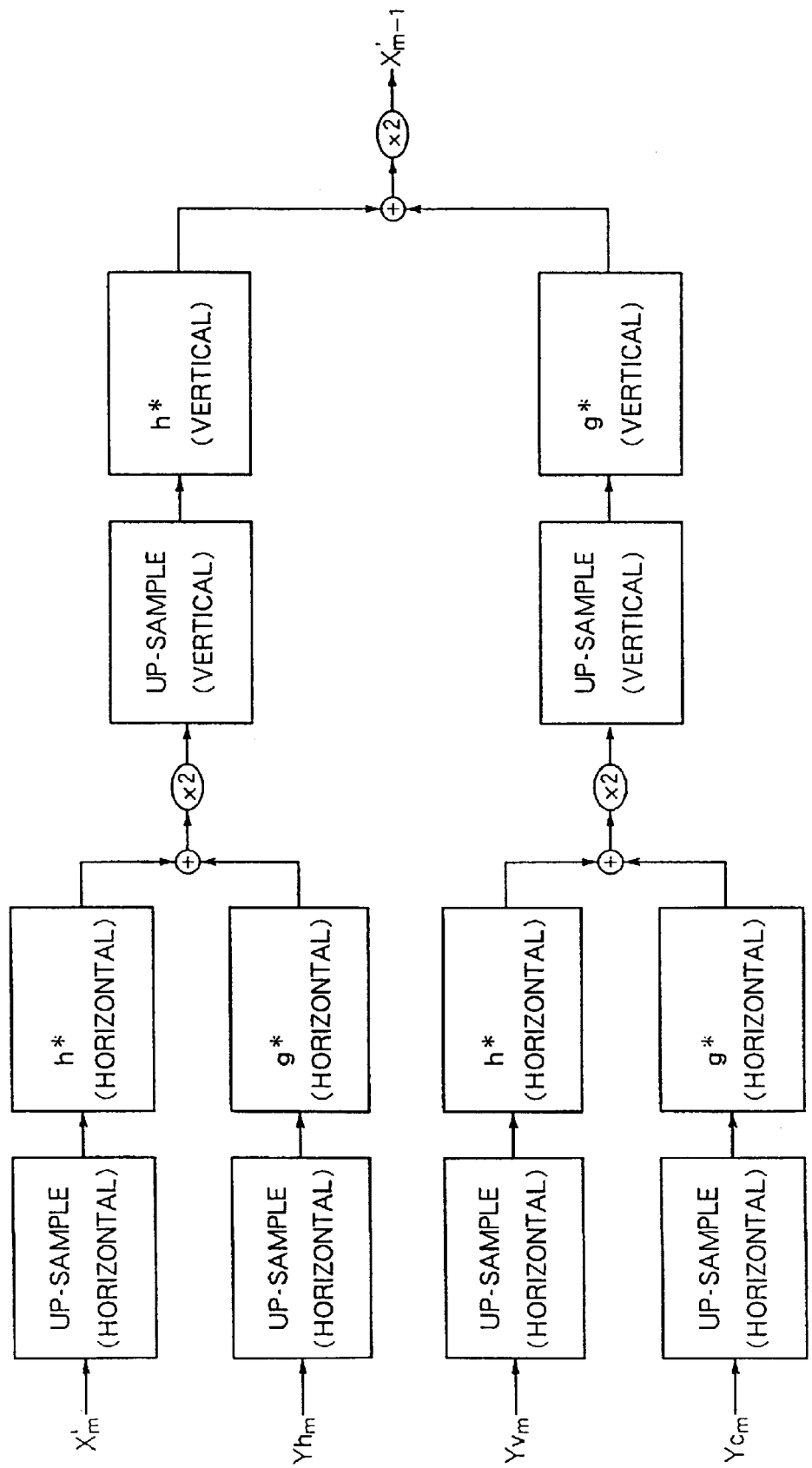
FIG. 13 is a flow diagram illustrating the inverse wavelet transform in the third embodiment.

Inverse wavelet processor 55-m operates on images $X'_m$, $Yv_m$, $Yh_m$, and $Yc_m$ as illustrated in FIG. 13, using the same complementary pair of high-pass and low-pass filters g* and h* as in the second embodiment, but not using the completion filter f*. As in the second embodiment, each filtering step is preceded by an up-sampling step and followed by a compensatory doubling of the pixel values. Up-sampling is carried out by inserting zero-valued pixels.

Inverse wavelet processor 55-m filters each of the four input images horizontally and vertically, and adds the four resulting images together to obtain the output image $X'_{m-1}$. Image $X'_m$ is filtered horizontally and vertically by h*; image $Yh_m$ is filtered horizontally by g* and vertically by h*; image $Yv_m$ is filtered horizontally by h* and vertically by g*; and image $Yc_m$ is filtered horizontally and vertically by g*. For computational efficiency, the results of the four horizontal filtering operations are added pairwise, so that only two vertical filtering operations have to be performed.

The operation performed by inverse wavelet processor 55-m can also be described by the following equation. As before, if either i/2+k/2 or j/2+l/2 is not an integer, the corresponding values of $X'_m$, $Yh_m$, $Yv_m$, and $Yc_m$ are zero.

$$X'_{m-1}(i, j) = 4\left[\sum_{k}\sum_{l} X'_m(i/2+k/2, j/2+l/2) \cdot h^*(k) \cdot h^*(l) + \right.$$
$$\sum_{k}\sum_{l} Yh_m(i/2+k/2, j/2+l/2) \cdot g^*(k) \cdot h^*(l) +$$
$$\sum_{k}\sum_{l} Yv_m(i/2+k/2, j/2+l/2) \cdot h^*(k) \cdot g^*(l) +$$
$$\left. \sum_{k}\sum_{l} Yc_m(i/2+k/2, j/2+l/2) \cdot g^*(k) \cdot g^*(l) \right]$$

The third embodiment provides the same advantages as the second and offers improved rendition of high-frequency detail in the reconstructed image, due to diagonal edge detection.

Fourth Embodiment

The fourth embodiment is similar to the third embodiment, differing only in the operation of the edge detector 52. Block diagrams will be omitted.

The edge detector 52 of the fourth embodiment begins by detecting horizontal, vertical, and diagonal edge sharpness by the methods described in the third embodiment, using a threshold value T. It next constructs thickened edges by including contiguous points with edge sharpness values exceeding a lower threshold U. Finally, it trims the edges so that each edge has a uniform thickness (although some edges may be thicker than others). This process will be explained below for an edge in the horizontal edge image Sh.

Figure 14:
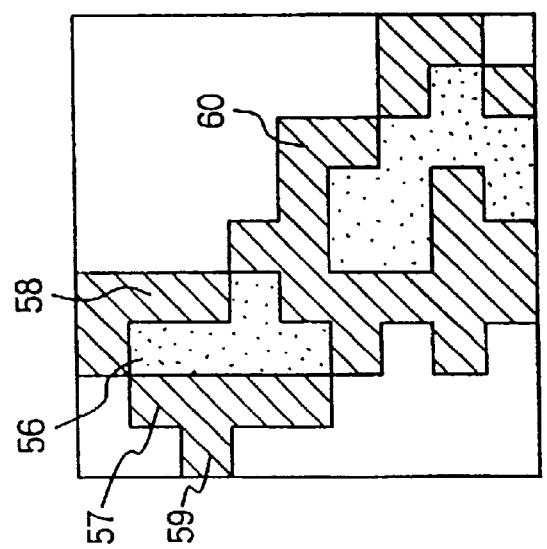
FIG. 14 is a diagram of an edge, illustrating irregular shape and fragmentation.

FIG. 14 shows part of a typical horizontal edge image Sh, using stippling to denote pixels with sharpness values exceeding T, and hatching to denote pixels exceeding U but not exceeding T. Here, "exceeding" means having a positive edge sharpness value exceeding T (or U). Pixels with negative sharpness values are processed separately.

Edge points in the horizontal edge image Sh tend to be organized into chains with a generally vertical orientation. FIG. 14 shows one such chain, running generally from the top left toward the bottom right. This edge is irregular in shape, however, and if detected by threshold T, the edge is fragmented into two parts. Such irregularities and fragmentation greatly impair the efficiency which which the edge image can be encoded.

Figure 15:
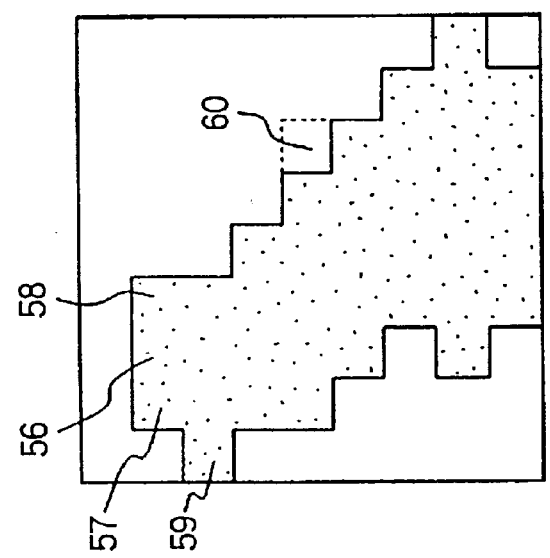
FIG. 15 illustrates thickening of the edge in FIG. 14 according to a fourth embodiment of the invention.

FIG. 15 shows the thickened version of this edge. The edge detector 52 constructs FIG. 15 from FIG. 14 by the following procedure.

Starting from the top left corner, the edge detector searches for a pixel in the horizontal edge image Sh in FIG. 14 exceeding threshold T. When the first such pixel is found, it is placed in the thickened edge image in FIG. 15 as the first pixel of the first layer of an edge. This first layer is then extended in the left and right directions by including any contiguous pixels having the same sign and exceeding threshold U. The extension continues as far in each direction as such contiguous pixels continue. In the drawings, pixel 56 is found first and pixels 57 and 58 are added to complete the first layer. If there were further pixels exceeding threshold U immediately to the left of pixel 57 or to the right of pixel 58, they would also be added in.

Next, if there any pixels exceeding threshold T immediately below the bottom layer of the edge so far, they are added to begin a new layer of the edge. This new layer is then extended to the left and right by adding contiguous pixels exceeding threshold U. In this extension process, all contiguous pixels exceeding threshold T are added in. Pixels exceeding threshold U but not exceeding threshold T are added in only if they are not disposed more than a certain limit extension distance beyond the ends of the preceding layer. In this example, the limit extension distance is one pixel. Thus pixel 59 is added, because it extends only one pixel past pixel 57, but the pixels to the left of pixel 59 would not be added to this layer unless they exceeded threshold T.

The edge detector continues in this manner, extending the thickened edge downward by adding new layers as long as it can find a pixel exceeding threshold T immediately below the bottom layer so far, and enlarging each layer horizontally to include contiguous pixels exceeding threshold T, as well as pixels exceeding threshold U out to the limit extension distance. In this example, pixel 60 is not added to the thickened edge because it would extend two pixels beyond the preceding layer, and the extension limit is one pixel.

When no pixels exceeding threshold T can be found below the bottom layer, the thickened edge is considered complete. The edge detector then searches for another pixel exceeding threshold T in absolute value to start a new thickened edge, and thickens this edge in the same way. This entire procedure is repeated until no more pixels exceeding threshold T can be found. A similar procedure is then followed to process pixels having negative sharpness values exceeding −T and −U.

Although the limit extension distance in the example above was one pixel, other limit extension distances such as zero, two, or three pixels can be used. The preferable limit extension distance depends in part on the threshold values T and U.

Figure 16:
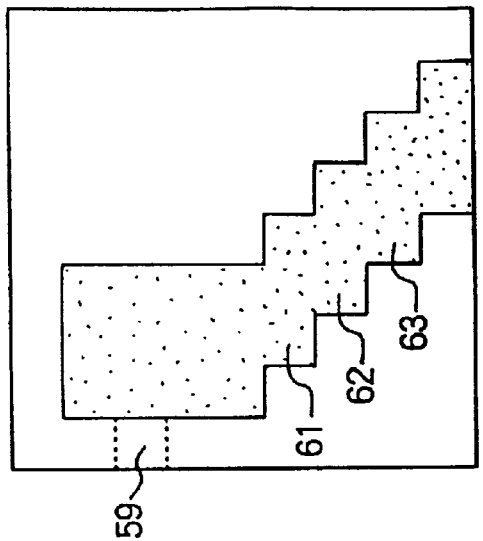
FIG. 16 illustrates trimming of the edge in FIG. 15 according to the fourth embodiment.

FIG. 16 shows the trimmed version of the thickened edge in FIG. 15. The trimmed edge is constructed by comparing adjacent layers in the thickened edge, and trimming the longer layer to match the length of the shorter layer. Thus pixel 59 is trimmed to reduce the length of its layer to three pixels, matching the length of the layer above. This trimming procedure is carried out from the top of the edge to the bottom, then repeated until all layers in the edge have been trimmed to the same length.

If the longer layer extends beyond the shorter layer at only one end, the extending end is trimmed. If the longer layer extends beyond the shorter layer at both ends, the edge detector 52 examines the preceding layer, and trims in such a way as to maintain a constant offset from one layer to the next. In FIG. 16, for example, after trimming layers 61 and 62, the edge detector 52 trims layer 63 so that it is offset one pixel to the right of layer 62, because layer 62 is similarly offset one pixel to the right of layer 61.

The trimmed edge in FIG. 16 is continuous, and has a more regular shape than the original edge in FIG. 14. These properties enable the edge in FIG. 16 to be encoded more efficiently than the edge in FIG. 14, even though it contains more pixels. In chain encoding, for example, after the position and length of the first layer have been specified, the position of the rest of the edge can be specified just by giving the offset of each layer from the preceding layer. In quantization of the edge sharpness values, pixels exceeding threshold U but not threshold T can be quantized to zero but then dequantized to a non-zero value in the digital image decoder.

In the vertical edge image Sv, edges are thickened and trimmed by a similar procedure, except that the thickening and trimming are done vertically, and the edge detector 52 works from left to right instead of from top to bottom.

Edges in the diagonal edge image Sc can be processed either horizontally or vertically. The choice depends on the way in which the diagonal edge image will be encoded. If vertical chain encoding is used, for example, the thickening and trimming should be done horizontally.

Edge thickening and trimming can also be added to the edge detection process in the first and second embodiments, and in any of the embodiments that follow. The invented edge thickening and trimming technique is moreover useful for regularizing edges in image encoding and image processing in general, and is not limited to edges detected by the difference-of-differences method.

Fifth Embodiment

The fifth embodiment is similar to the second embodiment, but is adapted to process moving images comprising successive frames.

Figure 17:
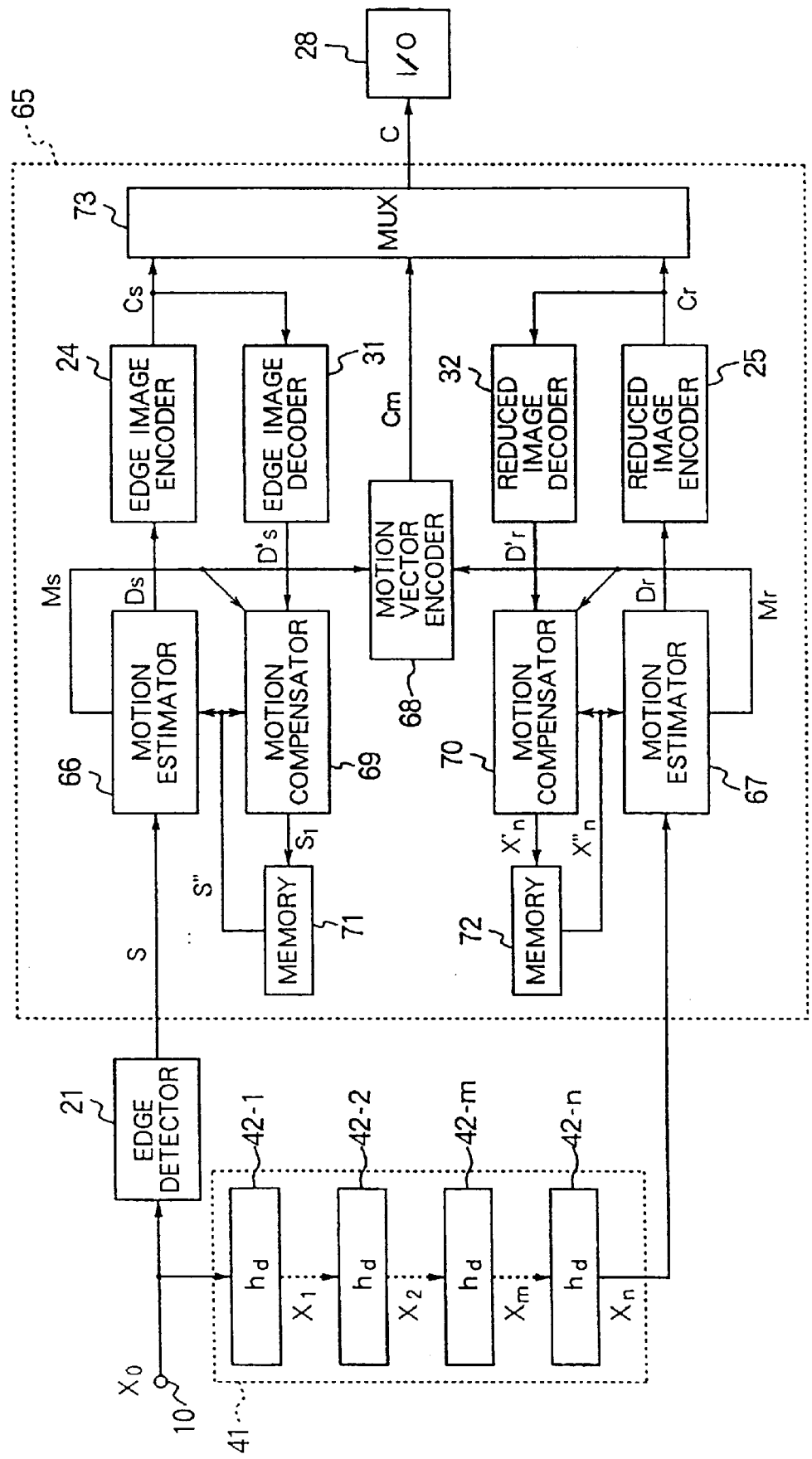
FIG. 17 is a block diagram of the digital image encoder in a fifth embodiment, for encoding moving images.

Referring to FIG. 17, the digital image encoder of the fifth embodiment has the same two-dimensional smoothing and down-sampling section 41 and edge detector 21 as in the second embodiment, but a different encoding section 65. The encoding section 65 comprises a pair of motion estimators 66 and 67, a motion vector encoder 68, a pair of motion compensators 69 and 70, and a pair of memories 71 and 72. It also has the same edge image encoder 24 and reduced image encoder 25 as in the digital image encoders of the preceding embodiments, and the same edge image decoder 31 and reduced image decoder 32 as in the digital image decoders of the preceding embodiments.

Motion estimator 66 receives the pair of edge images Sh and Sv from the edge detector 21. To simplify the drawing, this pair of edge images is denoted by the single letter S. Motion estimator 66 also receives a pair of previous edge images S" (a previous horizontal edge image and a previous vertical edge image) from memory 71. Motion estimator 66 outputs edge motion vectors Ms and a pair of horizontal and vertical edge difference images, denoted for simplicity by the single symbol Ds.

Motion estimator 67 receives the reduced image $X_n$ from the last smoothing filter 42-n and a previous reduced image $X''_n$ from memory 72, and outputs reduced motion vectors Mr and a reduced difference image Dr. The motion vector encoder 68 encodes motion vectors Ms and Mr and outputs motion information Cm.

The edge image encoder 24 encodes the edge difference images Ds and outputs edge image information Cs. This information is decoded by the edge image decoder 31 to produce a pair of decoded edge difference images, which are denoted in the drawing by the single symbol D's. Motion compensator 69 receives this pair of images D's, the previous pair of images S'', and the motion vectors Ms, and produces a pair of decoded edge images $S_1$, which it stores in memory 71.

Similarly, the reduced image encoder 25 encodes the reduced difference image Dr and outputs reduced image information Cr. The reduced image decoder 32 decodes Cr and outputs a decoded reduced difference image D'r. Motion compensator 70 receives this image D'r, the previous reduced image X''n, and the motion vectors Mr, and produces a decoded reduced image X'n which it stores in memory 72.

The multiplexer 73 multiplexes the edge image information Cs, motion information Cm, and reduced image information Cr for output as an encoded image C.

Figure 18:
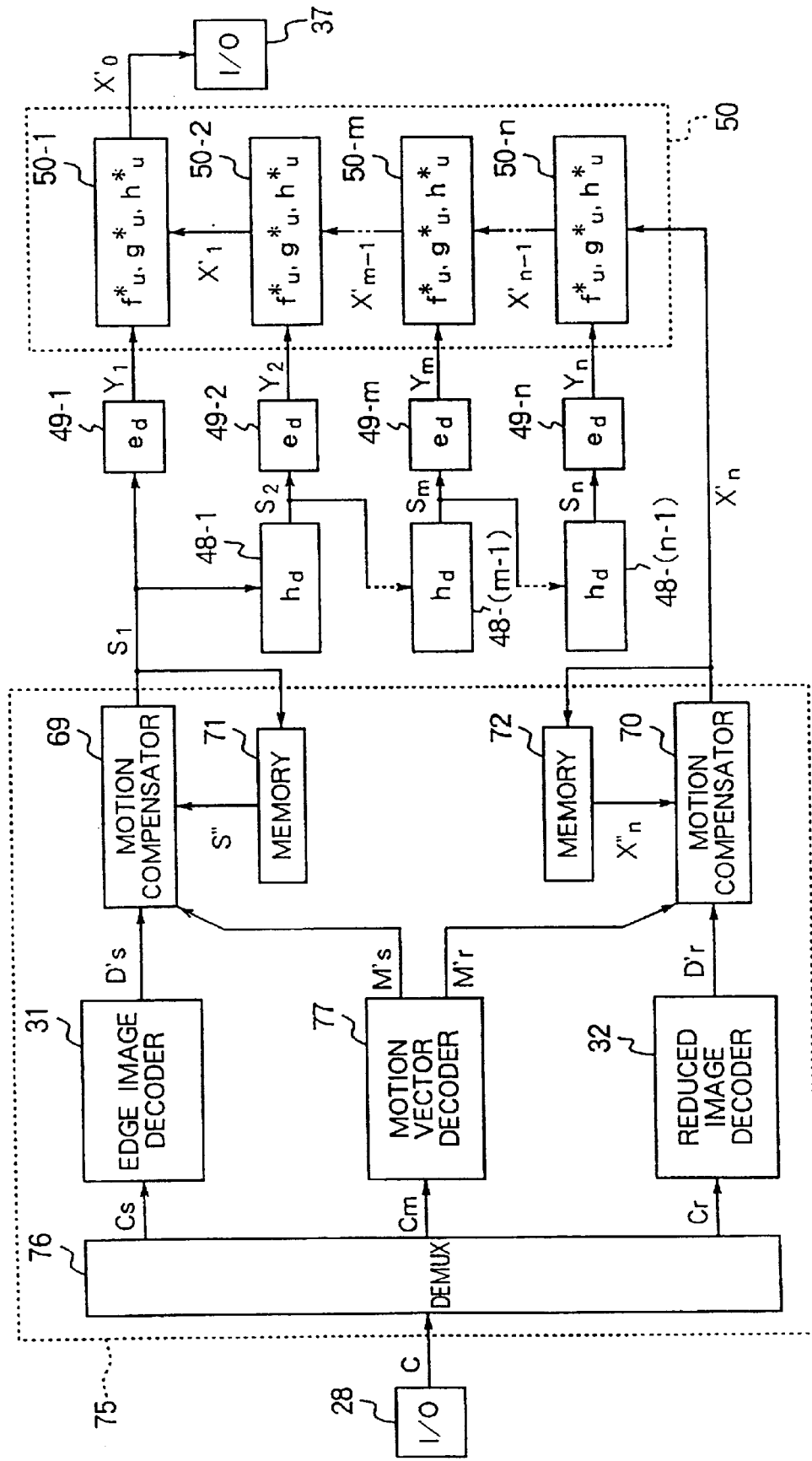
FIG. 18 is a block diagram of the digital image decoder in the fifth embodiment.

Referring to FIG. 18, the digital image decoder of the fifth embodiment has a decoding section 75 comprising a demultiplexer 76, a motion vector decoder 77, and decoders 31 and 32, motion compensators 69 and 70, and memories 71 and 72 identical to those in the digital image encoder in FIG. 17. The rest of the digital image decoder in FIG. 18 is the same as in the second embodiment, comprising smoothing and down-sampling filters 48-m (m=1 to n−1), edge synthesizers 49-m (m=1 to n), and all inverse wavelet transform processor 50.

The demultiplexer 76 receives the encoded image C from the input/output device 28 and demultiplexes it into edge image information Cs, motion information Cm, and reduced image information Cr. The motion vector decoder 77 decodes Cm to obtain decoded edge motion vectors M's and reduced motion vectors M'r. Other symbols in FIG. 18 are as already explained in FIGS. 6 and 17, with $S_m$ representing the pair of edge images $Sh_m$ and $Sv_m$, and $Y_m$ the pair of high-frequency images $Yh_m$ and $Yv_m$.

Next the operation of the fifth embodiment will be described. The description will be confined mainly to the encoding section 65 of the encoder.

Referring again to FIG. 17, motion estimator 67 estimates motion in the reduced image $X_n$ by, for example, the well-known block-matching method. This method involves comparing a block of pixels in the image $X_n$ with blocks displaced by k pixels horizontally and l pixels vertically from this block in the previous image $X''_n$ in memory 72, and selecting the vector (k, l) that gives the closest match. These vectors (k, l) are output as motion vectors Mr, while the differences between the pixel values in $X_n$ and the pixels values in $X''_n$ at positions offset by these motion vectors (k, l) are output as the reduced difference image Dr. Thus the reduced difference image Dr is the difference between $X_n$ and $X''_n$ over and above the motion represented by the motion vectors Mr.

Motion estimator 66 carries out a similar process separately on the horizontal and vertical edge images to obtain the motion vectors Ms and the pair of edge difference images denoted Ds. The motion vector encoder 68 encodes the motion vectors Ms and Mr by a lossless encoding method such as a variable-length encoding method.

The encoders 24 and 25 encode the difference images Ds and Dr by, for example, the same methods as used in the preceding embodiments. The decoders 31 and 32 employ methods reverse to those methods to obtain the decoded difference images D'r and D's.

Motion compensator 70 adds the decoded reduced difference image D'r to the previous reduced image $X''_n$ according to the motion vectors Mr, and stores the resulting image $X'_n$ in memory 72. "According to the motion vectors Mr" means that each pixel value in D'r is added to a corresponding pixel value in the previous reduced image $X''_n$ at a location offset by a motion vector (k, l) in Mr. The method by which $X'_n$ is obtained from D'r is inverse to the method by which Dr is obtained from $X_n$, and the operations of encoder 25 and decoder 32 are mutually inverse, so image $X'_n$ is substantially identical to image $X_n$.

Similarly, motion compensator 69 adds the two decoded edge difference images to the corresponding previous edge images according to the motion vectors Ms, and stores the resulting pair of decoded edge images $S_1$ in memory 71. The pair of edge images $S_1$ are substantially identical to the pair of edge images S output by the edge detector 21.

Memory 72 has space for storing at least two complete reduced images: the previous image $X''_n$ supplied to motion estimator 67 and motion compensator 70, and the new image $X'_n$ stored by motion compensator 70. At the end of each frame, the previous image $X''_n$ is discarded, leaving the new image $X'_n$, to be used as the previous image in the next frame. Memory 71 stores edge images in a similar fashion.

From time to time the motion estimators 66 and 67 may ignore the previous images S'' and $X''_n$ in the memories 71 and 72 and supply the edge images S and reduced image $X_n$ directly to the encoders 24 and 25, instead of supplying difference images. The motion information Cm in this case consists of a message indicating that the current frame does not require motion compensation. The motion compensators 69 and 70 then simply output the images received from the decoders 31 and 32.

The motion compensators 69 and 70 and memories 71 and 72 in the digital image decoder operate in the same way as the motion compensators 69 and 70 and memories 71 and 72 in the digital image encoder, using the decoded motion vectors M's and M'r supplied by the motion vector decoder 77. Since a lossless encoding scheme is employed for the motion vectors, M's and M'r are exactly identical to Ms and Mr, and the images denoted $S_1$ and $X'_n$ in FIG. 18 are exactly identical to the images denoted $S_1$ and $X'_n$ in FIG. 17. Further operation of the digital image decoder is as already described in the second embodiment.

By removing temporal redundancy, motion compensation can dramatically increase the coding efficiency of moving images, but block matching conventionally requires considerable computation. One advantage of the fifth embodiment is that most of the block matching is performed in the edge images, which have been thresholded and tend to consist mostly of zero-valued pixels. The large number of zero-valued pixels greatly speeds up the block-matching process. Further gains in speed are possible by using motion vectors calculated for one of the two edge images to help find motion vectors in the other edge image.

Another advantage is that the motion estimators and compensators in the digital image encoder and digital image decoder use identical previous images S'' and $X''_n$. This prevents the accumulation of quantization error and other image errors resulting from compressive coding in the encoders 24 and 25, and ensures consistency between motion estimation in the digital image encoder and motion compensation in the digital image decoder.

Other advantages of the fifth embodiment are as described in the second embodiment. The fifth embodiment can be employed in video teleconferencing and a wide variety of other multimedia applications.

Sixth Embodiment

The sixth embodiment is similar to the fifth embodiment, with further provisions for speeding up the computation of motion vectors.

Figure 19:
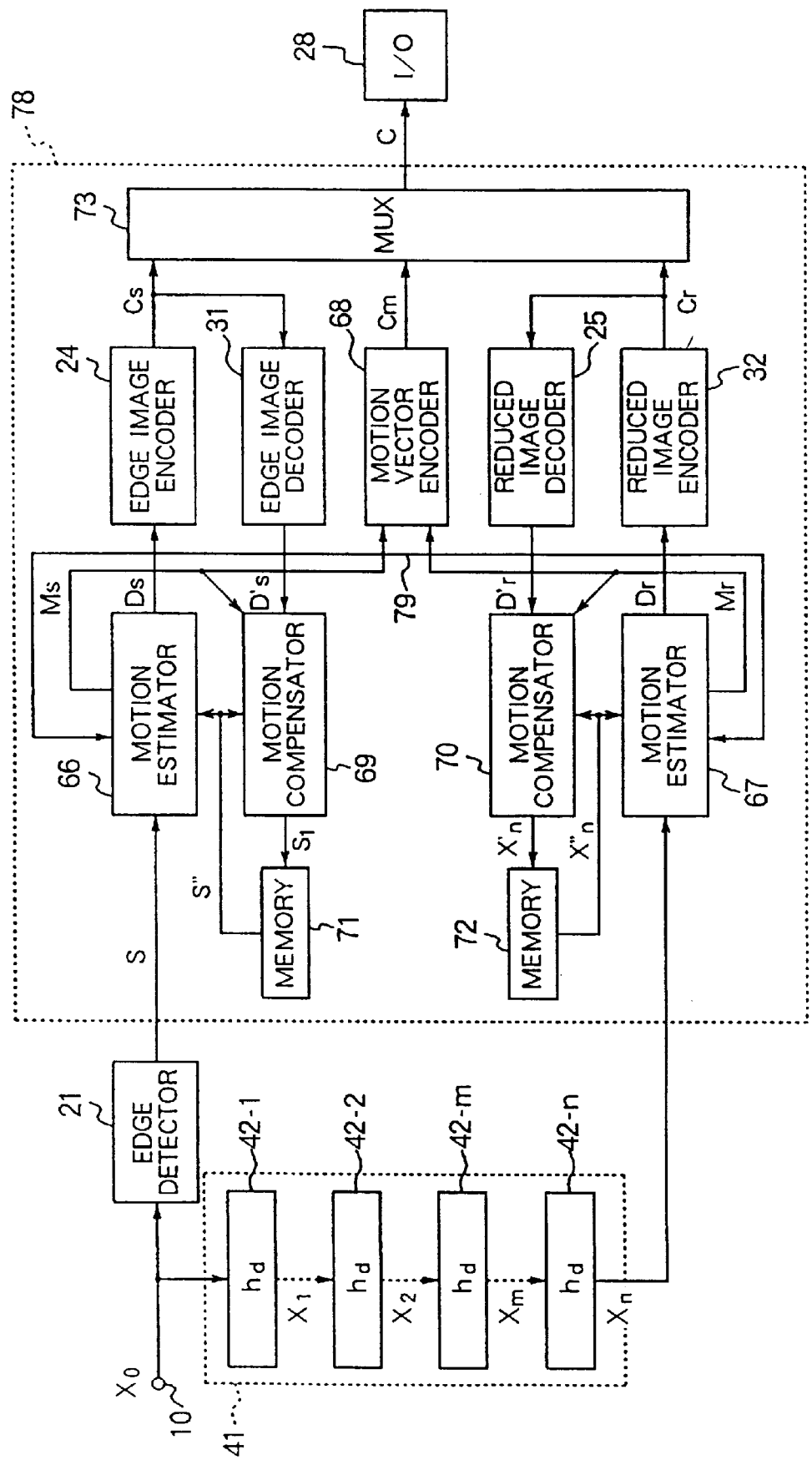
FIG. 19 is a block diagram of the digital image encoder in a sixth embodiment of the invention.

Referring to FIG. 19, the encoding section 78 of the digital image encoder in the sixth embodiment is similar to the encoding section 65 in the fifth embodiment, but has a bidirectional interconnection 79 between motion estimators 66 and 67. This enables motion estimator 67 to receive the edge motion vectors Ms found by motion estimator 66, scale them down to the size of the low-frequency reduced image $X_n$, and restrict the search for motion vectors in image $X_n$ to vectors close to the scaled-down edge motion vectors. In the extreme case, the search can be eliminated entirely: the reduced motion vectors Mr can be computed directly from the edge motion vectors Ms.

Alternatively, motion estimator 66 can receive the motion vectors Mr found by block matching in the low-frequency reduced image $X_n$, scale them up to the size of the edge images Sh and Sv, and restrict the search for motion vectors in Sh and Sv to vectors close to the scaled-up vectors. This scheme is particularly effective in detecting large, rapid motion.

Aside from this additional interconnection 79, the sixth embodiment has the same structure as the fifth embodiment and operates in the same way, so further description will be omitted. By narrowing down the search for motion vectors, the sixth embodiment enables frames to be encoded at a faster rate than in the fifth embodiment.

Seventh Embodiment

The seventh embodiment combines features of the third and fifth embodiments by detecting edges horizontally, vertically, and diagonally, and employing motion compensation.

Figure 20:
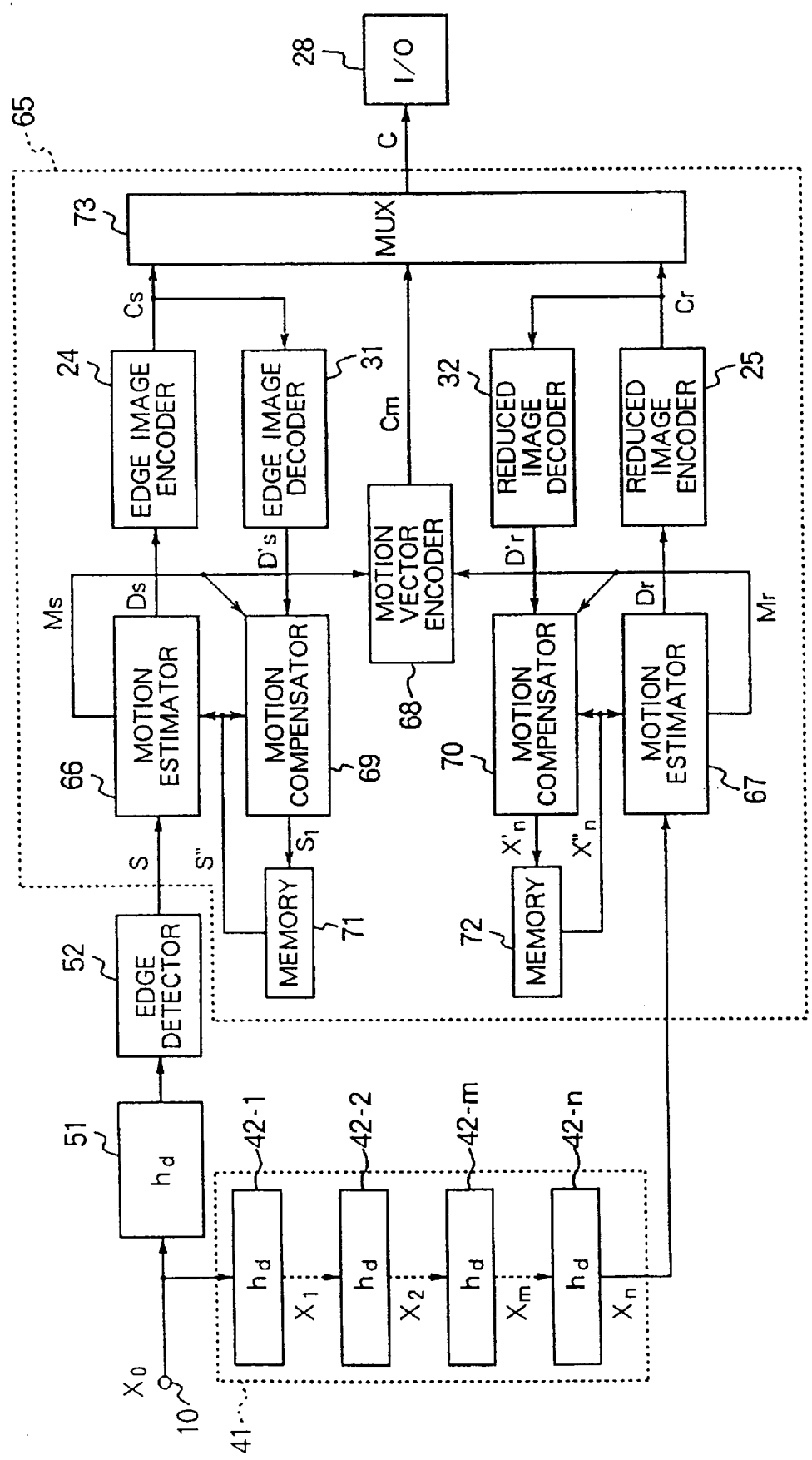
FIG. 20 is a block diagram of the digital image encoder in a seventh embodiment.

Referring to FIG. 20, the digital image encoder of the seventh embodiment has the same two-dimensional smoothing and down-sampling section 41, one-dimensional smoothing and down-sampling section 51, and edge detector 52 as in the third embodiment (FIG. 8), and the same encoding section 65 as in the fifth embodiment (FIG. 17). The symbol S in FIG. 20 denotes the set of three edge images Sv, Sh, and Sc in FIG. 8. Each of the symbols $S_1$, S", Ds, and D's likewise denotes a set of three edge images.

Figure 21:
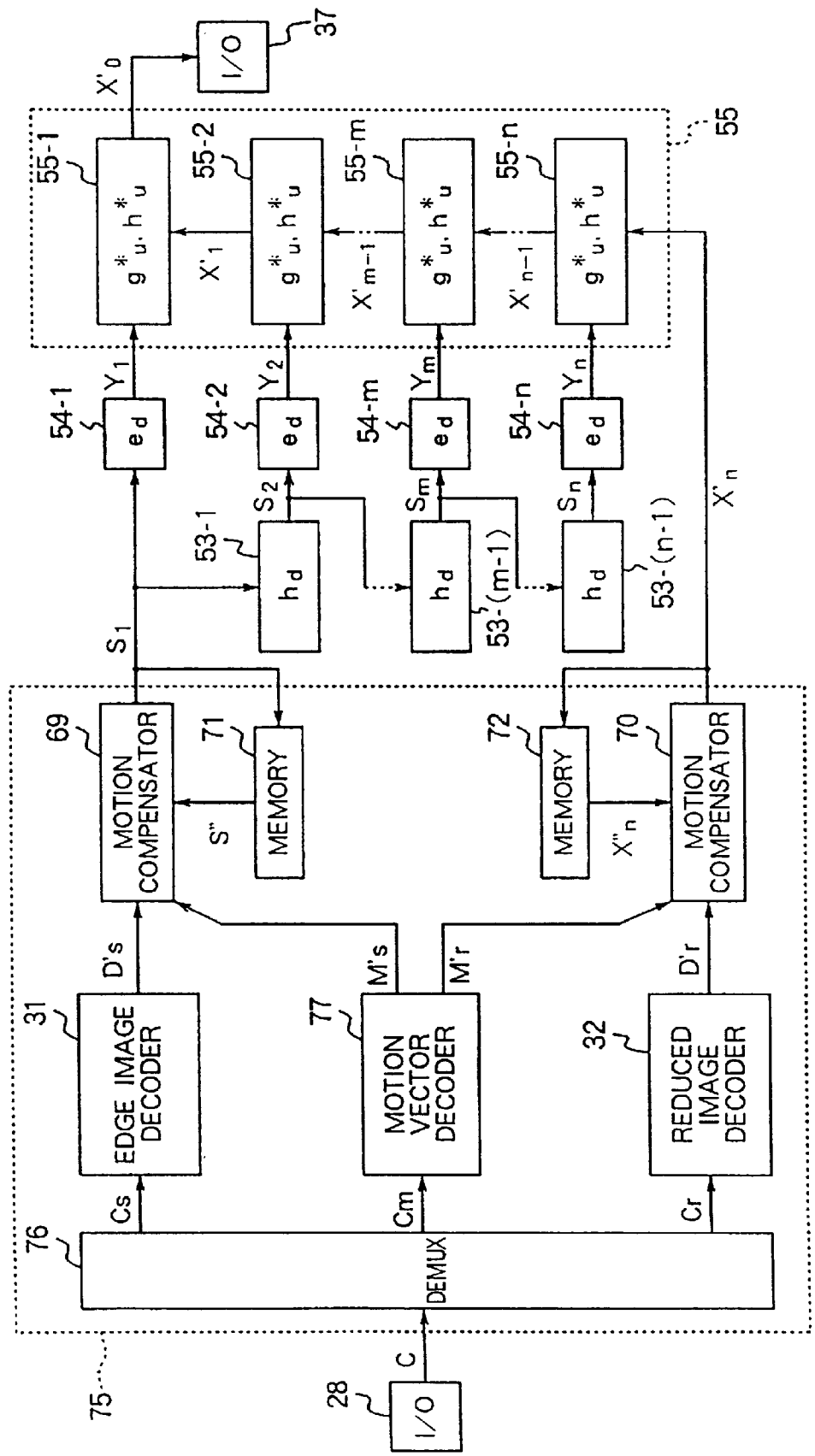
FIG. 21 is a block diagram of the digital image decoder in the seventh embodiment.

Referring to FIG. 21, the digital image decoder of the seventh embodiment has the same decoding section 75 as the fifth embodiment (FIG. 17), and the same two-dimensional smoothing and down-sampling filters 53-1 to 53-(n−1), edge synthesizers 54-1 to 54-n, and inverse wavelet transform processor 55 as in the third embodiment (FIG. 11).

The seventh embodiment operates as explained in the third and fifth embodiments, and provides similar effects, so further description will be omitted.

Eighth Embodiment

The eighth embodiment combines features of the sixth and seventh embodiments.

Figure 22:
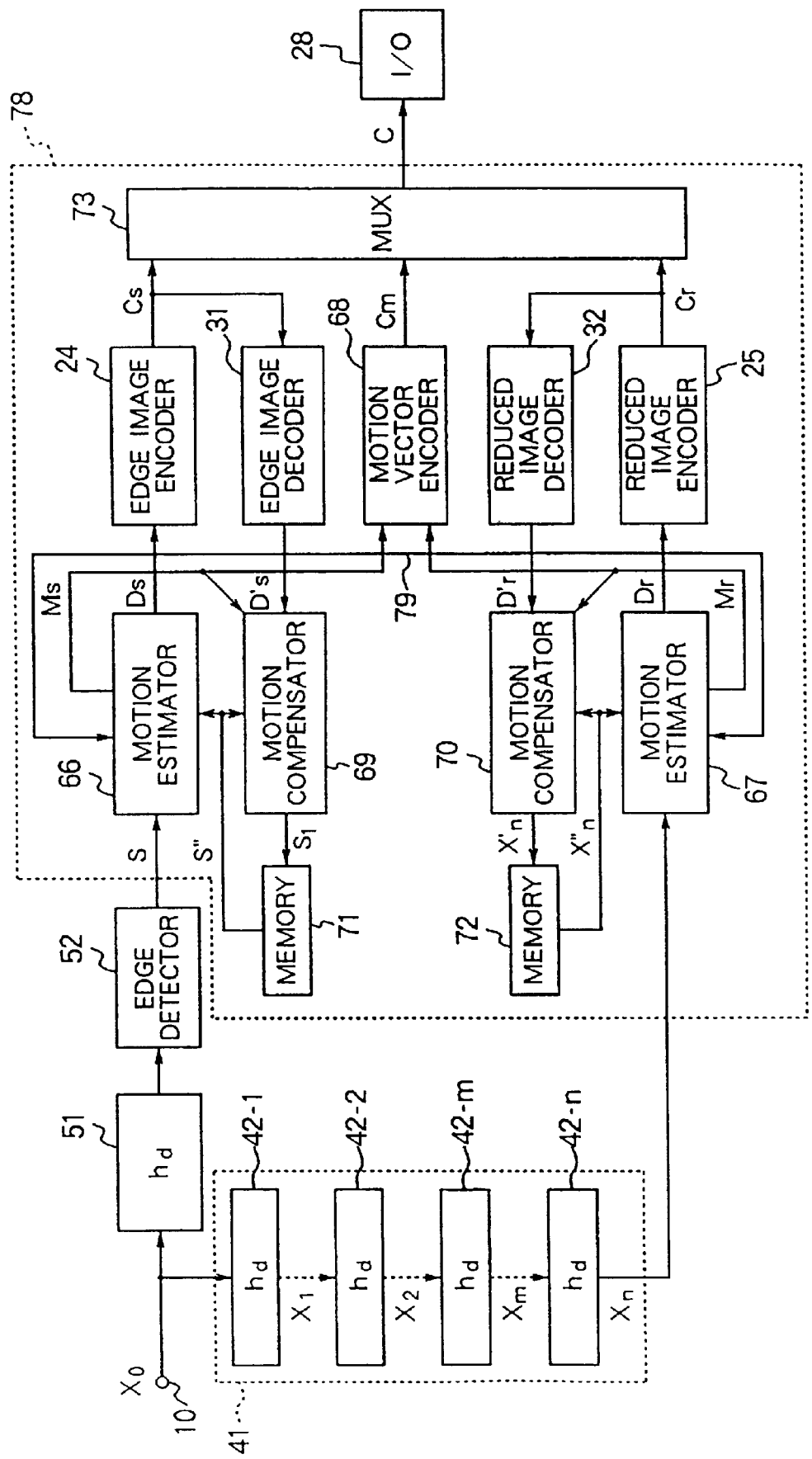
FIG. 22 is a block diagram of the digital image encoder in an eighth embodiment.

Referring to FIG. 22, the digital image encoder of the eighth embodiment has the same configuration as in the seventh embodiment (FIG. 20), except for the addition of a bidirectional interconnection 79 between motion estimators 66 and 67 as in the sixth embodiment (FIG. 19). The eighth embodiment operates as explained in the sixth and seventh embodiments, so further description will be omitted.

Ninth Embodiment

The ninth embodiment performs motion estimation before edge detection, smoothing, and down sampling. To maintain consistency between the encoder and decoder, the encoder performs substantially all the processes carried out in the decoder, including edge synthesis and the inverse wavelet transform.

Figure 23:
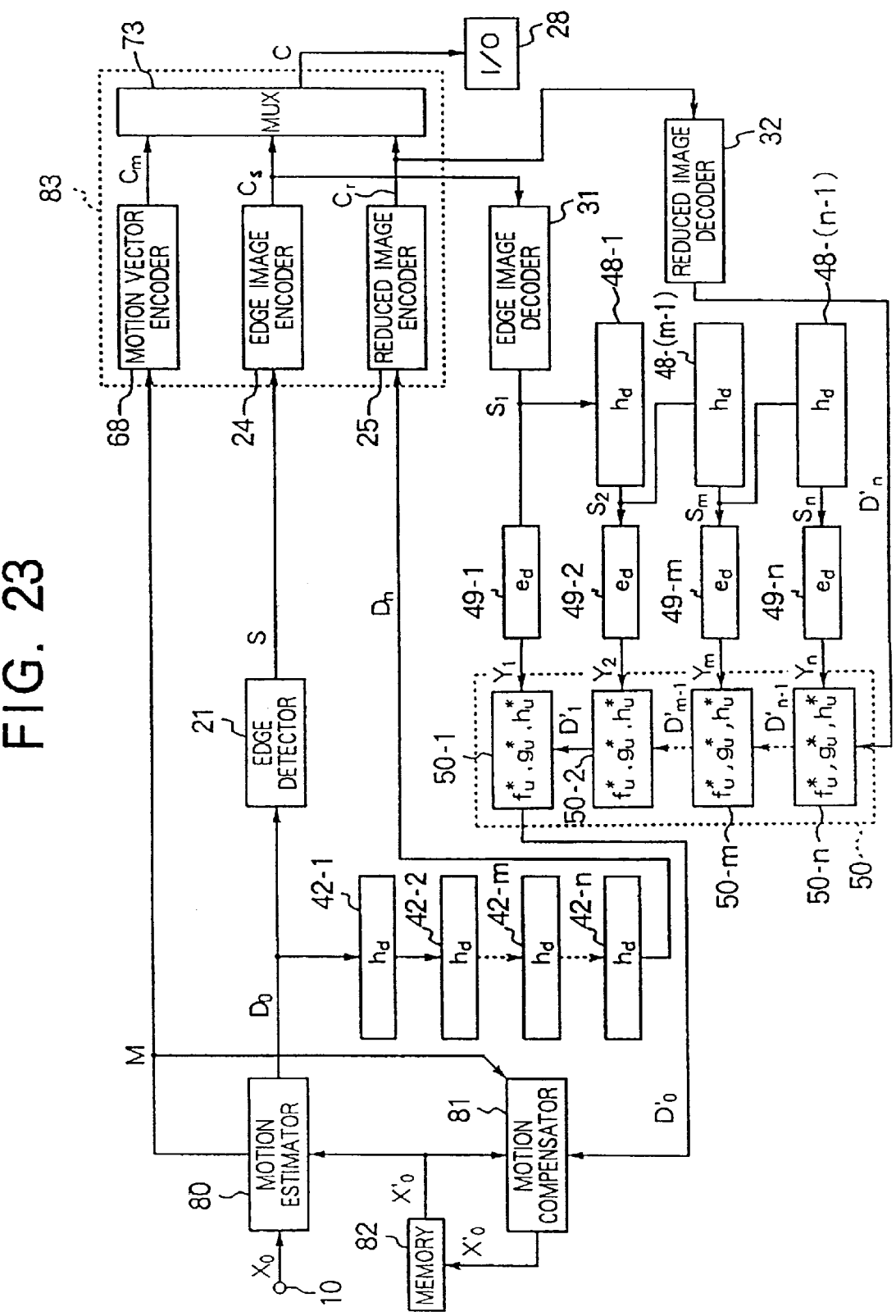
FIG. 23 is a block diagram of the digital image encoder in a ninth embodiment.

Referring to FIG. 23, the original image frames input at the input terminal 10 are supplied to a motion estimator 80, which performs motion estimation as described above, outputting a difference image $D_0$ and motion vectors M. The motion vectors M are encoded by a motion vector encoder 68 as in the fifth to eighth embodiments. The difference image $D_0$ is supplied to an edge detector 21 and two-dimensional smoothing and down-sampling section 41 in place of the original image $X_0$, and is processed in the same way that the original image $X_0$ was processed in the second embodiment. The resulting pair of edge images will again be denoted by the symbol S, while the reduced image resulting from smoothing and down-sampling of $D_0$ will be denoted $D_n$. These images S and $D_n$ are encoded by respective encoders 24 and 25 to produce encoded image information Cs and Cr, which is combined with the motion information Cm by a multiplexer 73 as in the preceding embodiments.

The encoded information Cs and Cr is also decoded by decoders 31 and 32 to produce decoded images $S_1$ and $D'_n$. These are supplied to two-dimensional smoothing and down-sampling filters 48-m (m=1 to n−1), edge synthesizers 49-m (m=1 to n), and an inverse wavelet transform processor 50 which are identical to the corresponding elements in the digital image decoder of the second embodiment, shown in FIG. 6. The inverse wavelet transform processor 50 outputs a reconstructed difference image $D'_0$ to a motion compensator 81.

Using this image $D'_0$, the motion vectors M output by the motion estimator 80, and a previous image $X''_0$ stored in a memory 82, the motion compensator 81 produces a new reconstructed image $X'_0$, which is stored in the memory 82. The previous image $X''_0$ was also supplied to the motion estimator 80 for use in motion estimation. The reconstructed image $X'_0$ will become the previous image in the next frame.

The motion estimator 80, motion compensator 81, and memory 82 in FIG. 23 operate like the motion estimator 67, motion compensator 70, and memory 72 in the fifth or seventh embodiment (FIG. 17 or 20), although they operate on the original image $X_0$ instead of the reduced image $X_n$. The inverse waveform processors 50-m in FIG. 23 operate like the inverse waveform processors 50-m in the second embodiment (FIG. 6), although they process a series of partially reconstructed difference images $D'_m$ instead of a series of partially reconstructed images $X'_m$ (m=1 to n), and output a fully reconstructed difference image $D'_0$ instead of a fully reconstructed image $X'_0$.

The encoding section 83 in the ninth embodiment comprises the motion vector encoder 68, edge image encoder 24, reduced image encoder 25, and multiplexer 73.

Figure 24:
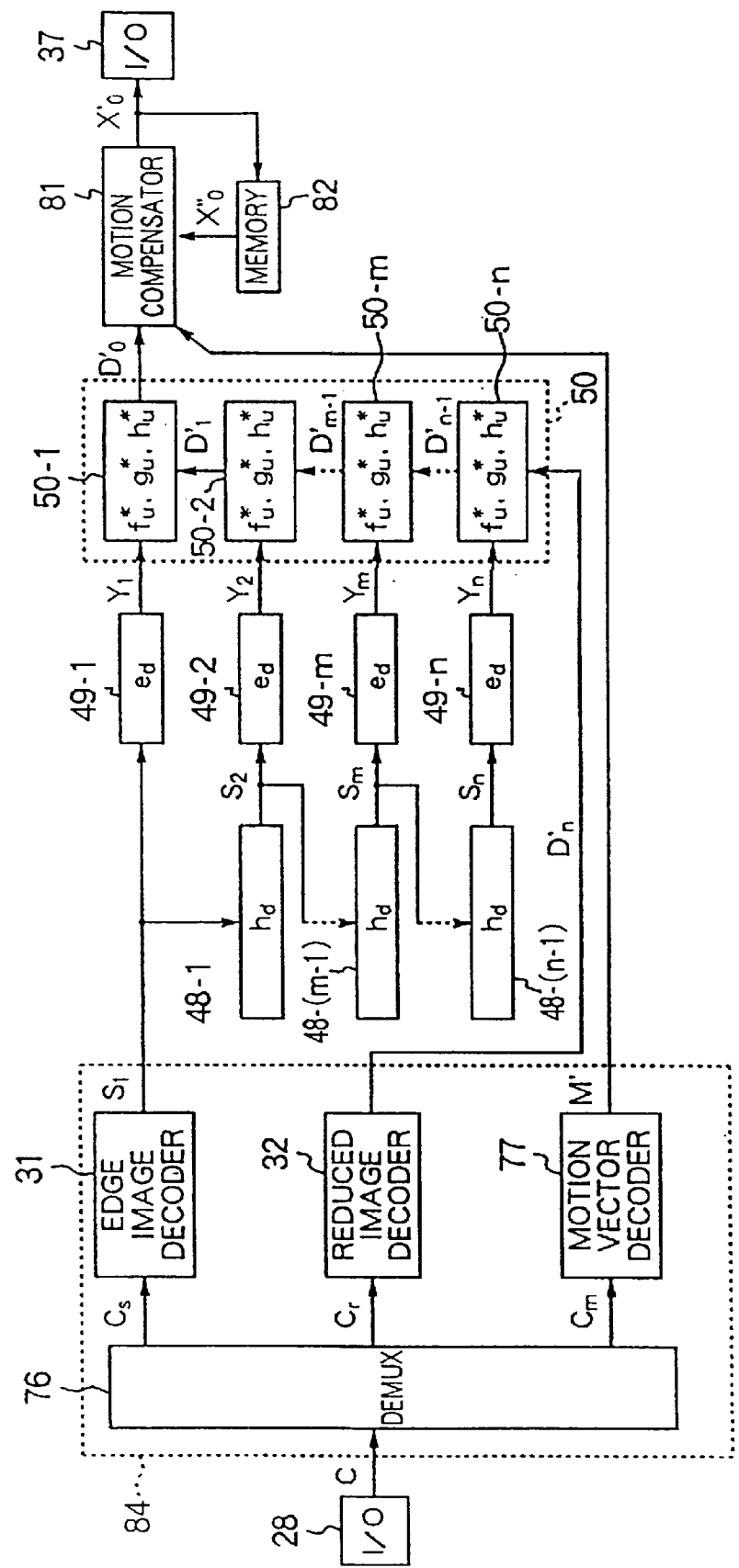
FIG. 24 is a block diagram of the digital image decoder in the ninth embodiment.

Referring to FIG. 24, the digital image decoder of the ninth embodiment has a decoding section 84 with a demultiplexer 76 and motion vector decoder 77 similar to those in the fifth to eighth embodiments. The other elements in FIG. 24 are similar to the elements with the same reference numerals in FIG. 23. The motion compensator 81 receives a fully reconstructed difference image $D'_0$ from the inverse wavelet transform processor 50, and outputs a fully reconstructed image $X'_0$ to the input/output device 37.

As in the fifth to eighth embodiments, the digital image encoder in FIG. 23 and digital image decoder in FIG. 24 operate with identical previous images $X''_0$, thereby maintaining consistency between motion estimation in the encoder and decoder. Performing motion estimation before edge detection can lead to higher compression ratios than in the fifth to eighth embodiments, because only one set of motion vectors has to be encoded.

Tenth Embodiment

The tenth embodiment combines features of the third and ninth embodiments. Three edge images are detected, as in the third embodiment. Edge detection, smoothing, and down-sampling are preceded by motion estimation, and followed by all the processes performed in the digital image decoder, as in the ninth embodiment.

Figure 25:
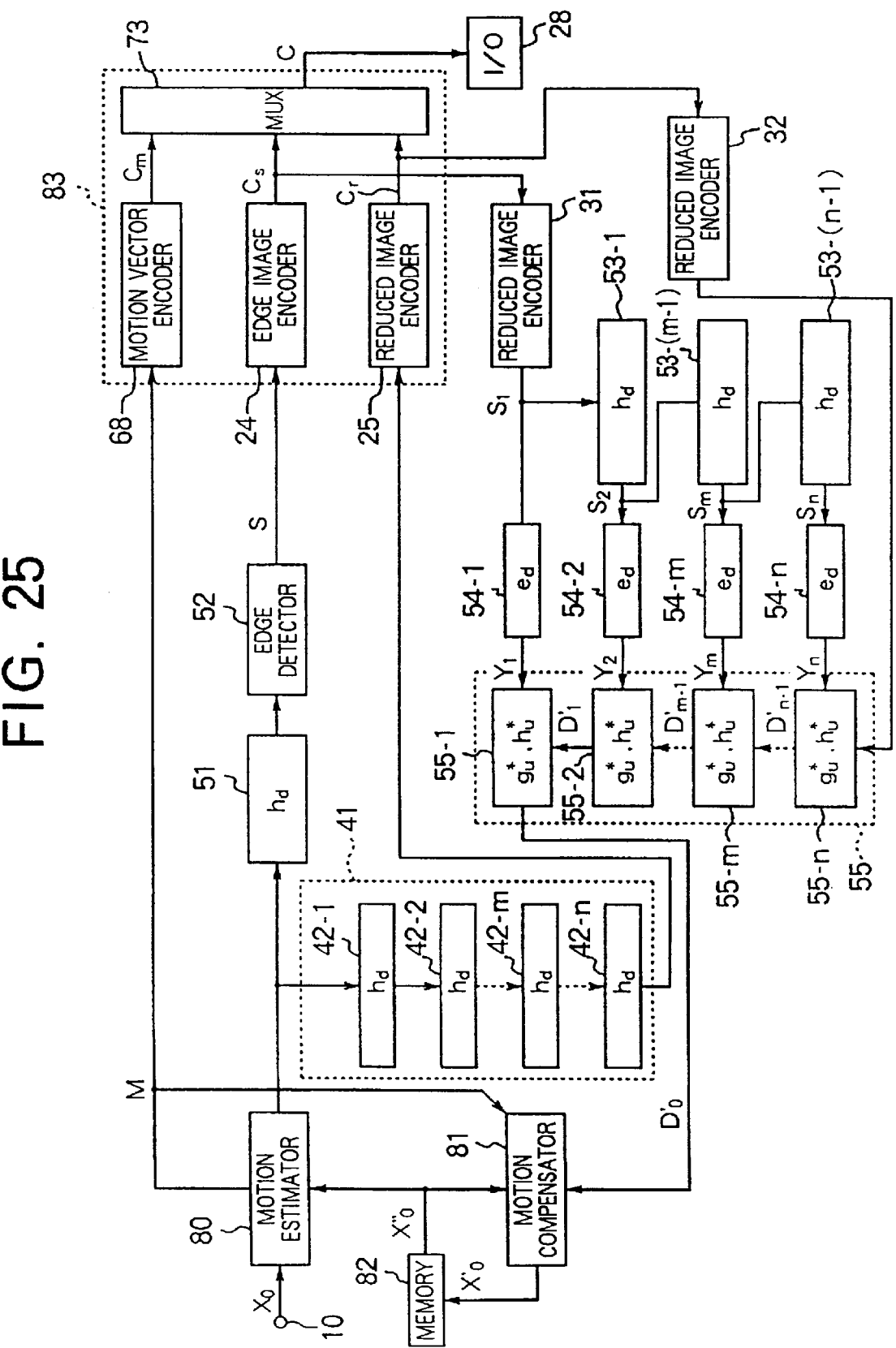
FIG. 25 is a block diagram of the digital image encoder in a tenth embodiment.
Figure 26:
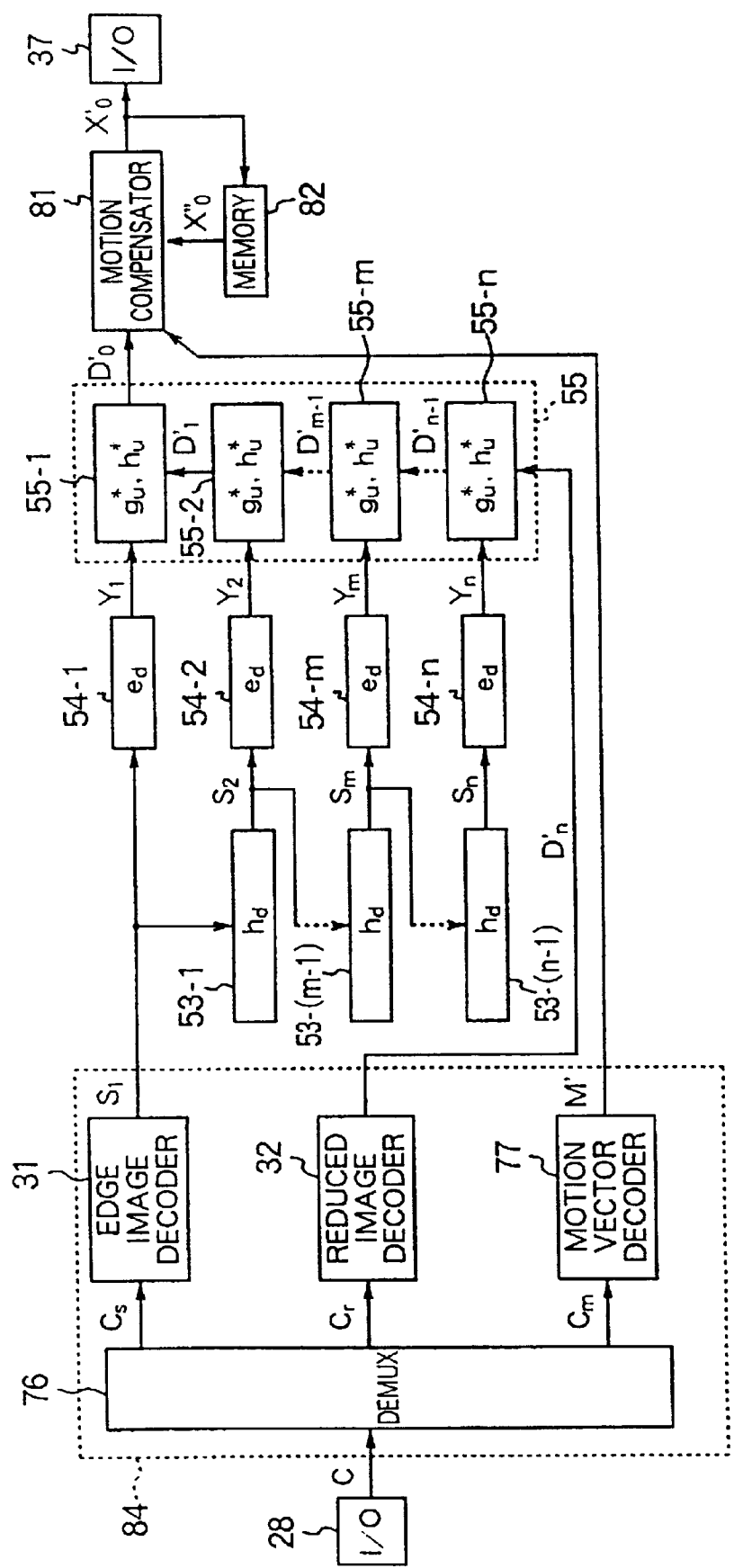
FIG. 26 is a block diagram of the digital image decoder in the tenth embodiment.

Referring to FIG. 25, the digital image encoder of the tenth embodiment has the motion estimator 80, motion compensator 81, memory 82, and encoding section 83 of the ninth embodiment (FIG. 23), and other elements as in the third embodiment (FIGS. 9 and 11). Referring to FIG. 26, the digital, image decoder has the decoding section 84, motion compensator 81, and memory 82 of the ninth embodiment (FIG. 24), and other elements as in the third embodiment (FIG. 11)

The tenth embodiment operates as described in the third and ninth embodiments, and provides similar advantages. A detailed description will be omitted.

Eleventh Embodiment

The eleventh embodiment is a digital image encoder/decoder (codec) that combines the functions of the digital image encoder and decoder of the ninth embodiment. The eleventh embodiment thus provides one device that can operate in either an encoding mode or a decoding mode.

Figure 27:
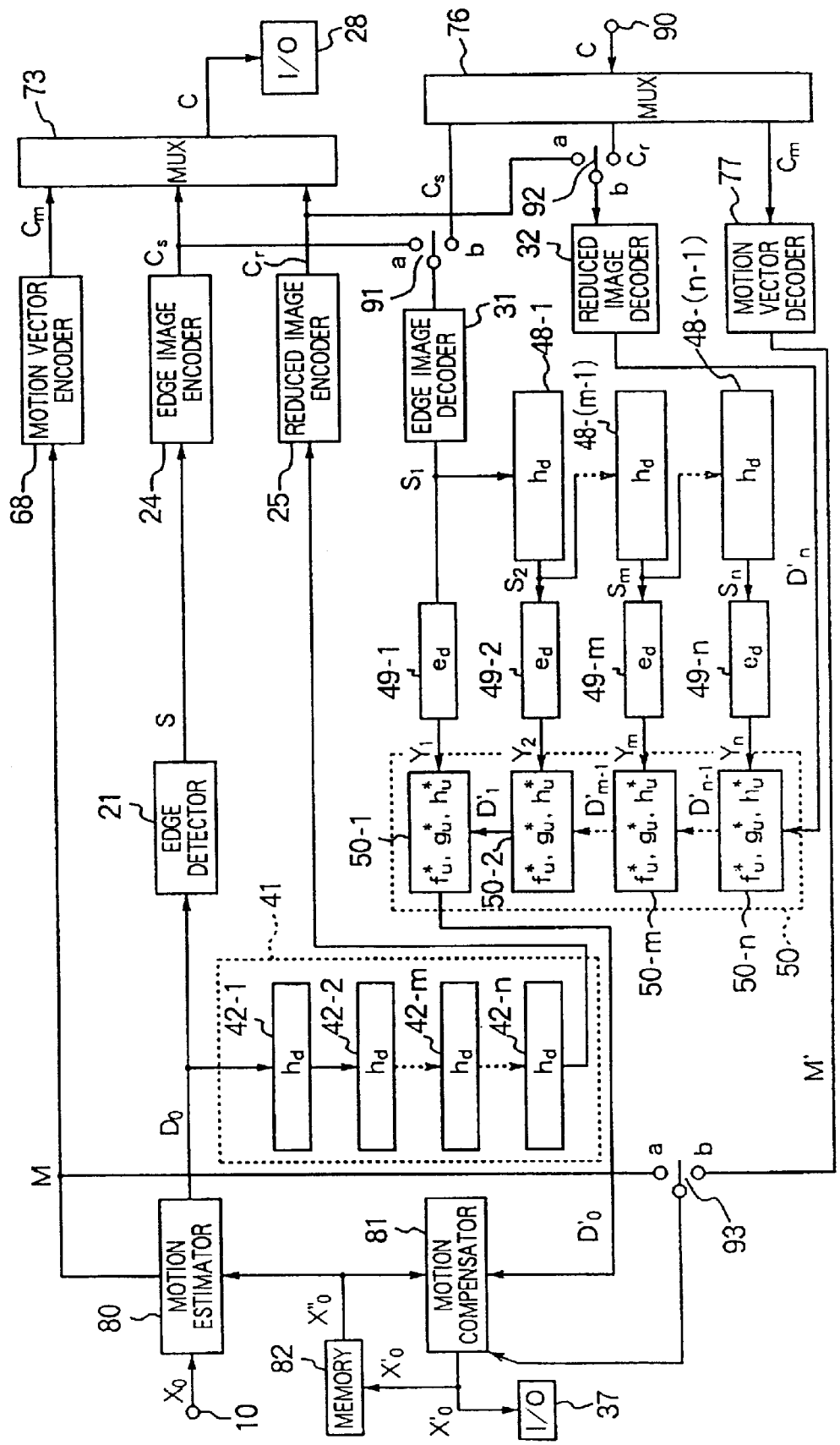
FIG. 27 is a block diagram of a digital image encoder/decoder in an eleventh embodiment of the invention.

Referring to FIG. 27, to the digital image encoder of the ninth embodiment (FIG. 23), the eleventh embodiment adds the demultiplexer 76 and motion vector decoder 77 of the digital image decoder of the ninth embodiment (FIG. 24), a second input terminal 90, and three switches 91, 92, and 93.

To encode a moving image, switches 91, 92, and 93 are set to the position marked "a" in the drawing. Successive frames $X_0$ are input at input terminal 10 and processed just as in the digital image encoder of the ninth embodiment, the encoded results being output from the demultiplexer 73 to input/output device 28.

To decode an encoded moving image, switches 91, 92, and 93 are set to the position marked "b." The encoded moving image C is input from the second input terminal 90 to the demultiplexer 76 and processed just as in the digital image decoder of the ninth embodiment, the decoded results being output from the motion compensator 81 to input/output device 37.

The eleventh embodiment has the same advantages as the ninth embodiment, with the further advantage of allowing the encoding and decoding functions to share the same motion compensator 81, decoders 31 and 32, filters 48-m, edge synthesizers 49-m, and inverse wavelet transform processor 50, thereby avoiding needless duplication. This embodiment is particularly suited for videophones and other bidirectional video systems.

Twelfth Embodiment

The twelfth embodiment is a digital image encoder/decoder that combines the features of the tenth and eleventh embodiments.

Figure 28:
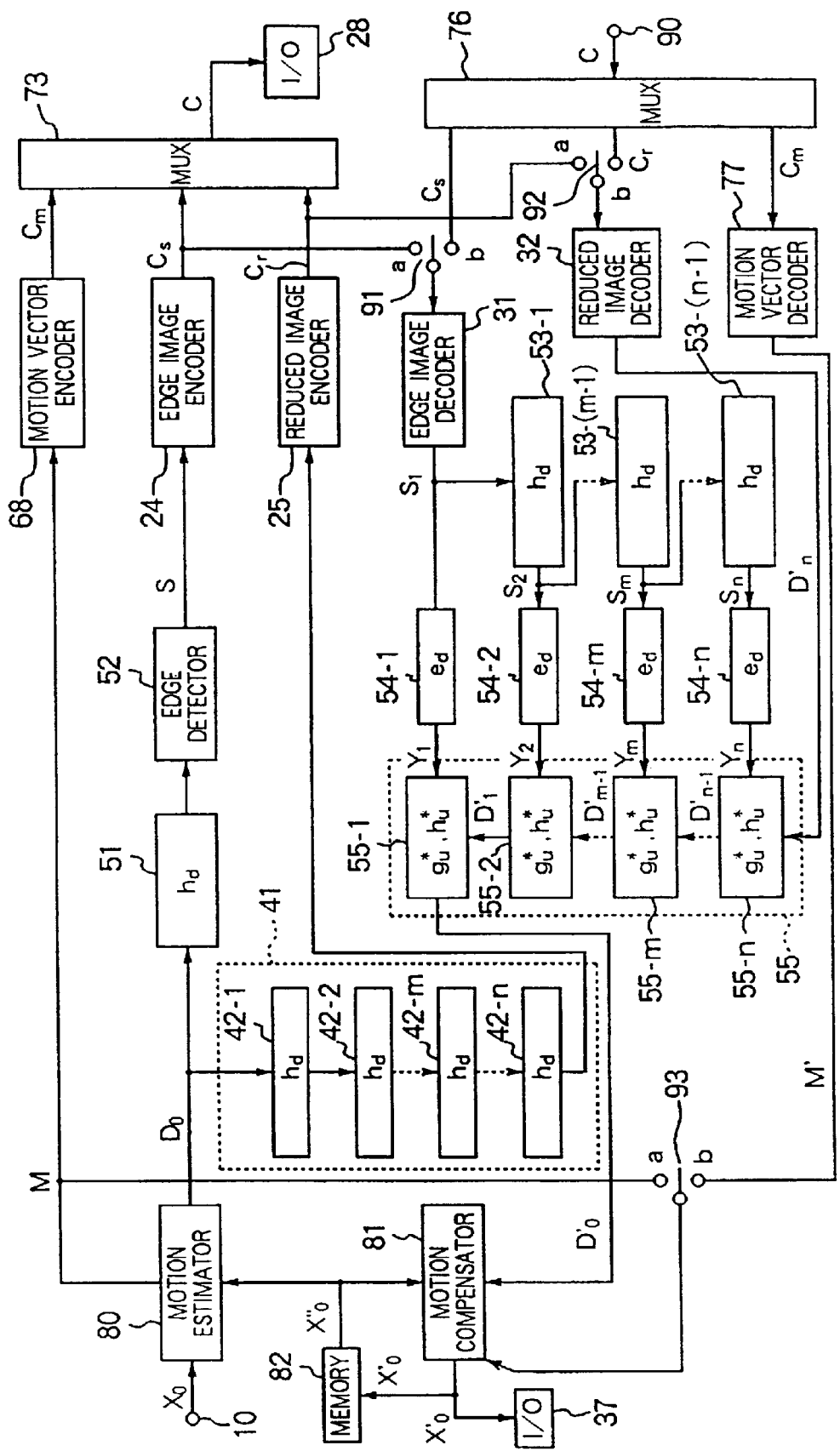
FIG. 28 is a block diagram of a digital image encoder/decoder in a twelfth embodiment.

Referring to FIG. 28, the twelfth embodiment adds to the digital image encoder of the tenth embodiment (FIG. 25) the same demultiplexer 76, motion vector decoder 77, second input terminal 90, and switches 91, 92, and 93 as in the eleventh embodiment. The twelfth embodiment operates like the eleventh, but has the further advantage of improved rendition of high-frequency image detail due to diagonal edge detection.

As described above, the invented encoding and decoding method and devices provide high compression rates with modest amounts of computation. Although there is some loss of detail, reconstructed images are not distorted, and because high-frequency information is synthesized in a single step instead of by iteration, the reconstruction process is reliably completed within a short and definite time. The invention can be usefully applied to both still and moving images for a wide variety of purposes, in a wide variety of systems.

The scope of the invention is not restricted to the embodiments described above, but includes such further variations as the following.

In the first, second, fifth, sixth, ninth, and eleventh embodiments, instead of producing separate horizontal and vertical edge images, the edge detector 21 can output a single edge image in which each edge point has both a sharpness value $S(i, j)$ and direction angle $\theta(i, j)$, computed from $Sh(i, j)$ and $Sv(i, j)$ by, for example, the following formulas:

$$S(i, j) = \text{sgn}[Sh(i, j)][Sh(i, j)^2 + Sv(i, j)^2]^{1/2} \theta(i, j) = \arctan[Sv(i, j)/Sh(i, j)]$$

In these formulas, sgn denotes the algebraic sign (plus or minus one), and arctan the inverse tangent function. The encoding section then has only one set of edge positions to encode. The decoding section in the digital image decoder can recover $Sh(i, j)$ and $Sv(i, j)$ from $S(i, j)$ and $\theta(i, j)$ This method of encoding only a single edge image is particularly effective if chain encoding is employed, because the direction angle tends to change only slowly along a chain of edge points. Moreover, the angle tends to be perpendicular to the direction of the chain, so it is possible to have the edge detector calculate only the above edge sharpness $S(i, j)$, and let the decoder infer the direction angle $\theta(i, j)$ of an edge point $(i, j)$ from the direction of the chain in the vicinity of that point. The compression ratio can be significantly improved in this way, although with some loss of reconstruction accuracy.

This encoding method can also be applied to the horizontal and vertical edge images in the other embodiments, if the original image is not down-sampled before horizontal and vertical edge detection. The necessary down-sampling is then performed instead in the decoder, as in the second embodiment. In the fifth, sixth, seventh, and eighth embodiments, this encoding method has the further advantage of reducing the number of edge images for which motion vectors have to be computed.

In the digital image encoder in any of the embodiments, it is possible to have the two-dimensional smoothing performed in a single step, instead of by a cascaded series of filters. The filters $h_1, h_2, \ldots, h_n$ in the first embodiment, for example, can be mutually convolved to yield a single filter that gives the same result as applying the cascaded series of filters. For use in the other embodiments, down-sampling can be incorporated into this single filter simply by calculating the values of only $\frac{1}{4^n}$ of the output pixels.

The smoothing filters applied in the horizontal and vertical directions need not be identical. A smoothing filter with an even number of taps can be applied in one of these directions, and a smoothing filter with an odd number of taps in the other direction. The edge synthesis filters (e), completion filters (f), and high-pass filters (g) employed for decoding then also require separate versions for the horizontal and vertical directions.

Edge detection is not limited to the difference-of-differences method. This method is preferred, but other methods can be employed.

The filters employed were described as being symmetric around zero or ½, but this is only a matter of notation. The center of symmetry can be disposed at any convenient location.

The standard edge from which the edge synthesis filters are generated need not be an edge of the type shown in FIG. 3, in which pixel values change at first one constant rate, then another constant rate. Other types can be used, provided the standard edge has only one point which would be detected as an edge point by the edge detector.

Those skilled in the art will recognize that still further variations are possible without departing from the scope claimed below.

What is claimed is:

1. A moving image coder/decoder having a first state and a second state, for encoding a moving image consisting of successive frames in said first state, and decoding an encoded moving image in said second state, comprising:

a first input terminal for receiving a current frame among said successive frames;

a memory for storing a previous frame among said frames;

a motion estimator coupled to said input terminal and said memory, for detecting motion of said current frame with respect to said previous frame, generating motion vectors, and detecting differences between said current frame and said previous frame over and above said motion of said digitized image, thereby generating a digitized image consisting of pixels having pixel values;

a two-dimensional smoothing and down-sampling section coupled to said input terminal, for filtering and down-sampling said digitized image to generate a reduced image;

an edge detector coupled to said input terminal, for generating at least one edge image by detecting edge points in said digitized image;

an edge image encoder for encoding said edge image, thereby generating edge image information;

a reduced image encoder for encoding said edge reduced image, thereby generating reduced image information;

a motion vector encoder coupled to said motion estimator, for encoding said motion vectors, thereby generating motion information;

a multiplexer coupled to said motion vector encoder, said edge image encoder, and said reduced image encoder, for multiplexing and outputting said motion information, said edge image information, and said reduced image information;

a second input terminal for receiving said encoded moving image;

a demultiplexer for demultiplexing said encoded moving image into edge image information, reduced image information, and motion information;

a first switch coupled to said edge image encoder and said demultiplexer, for selecting the edge image information generated by said edge image encoder in said first state and the edge image information demultiplexed by said demultiplexer in said second state;

a second switch coupled to said reduced image encoder and said demultiplexer, for selecting the reduced image information generated by said reduced image encoder in said first state and the reduced image information demultiplexed by said demultiplexer in said second state;

a motion vector decoder for decoding said motion information to obtain motion vectors;

a third switch coupled to said motion estimator and said motion vector decoder, for selecting the motion vectors generated by said motion estimator in said first state and the motion vectors obtained by said motion vector decoder in said second state;

an edge image decoder coupled to said first switch, for decoding the edge image information selected by said first switch, thereby generating a first set of decoded edge images;

a reduced image decoder coupled to said second switch, for decoding the reduced image information selected by said second switch, thereby generating a decoded reduced image;

at least one two-dimensional smoothing and down-sampling filter for smoothing and down-sampling said first set of decoded edge images, thereby generating a series of sets of decoded edge images, said first set of decoded edge images being included in said series of sets of decoded edge images;

a plurality of edge synthesizers having respective edge synthesis filters, for synthesizing a series of sets of high-frequency images from respective sets of decoded edge images by filtering with said edge synthesis filters;

an inverse wavelet transform processor, coupled to said reduced image decoder and said plurality of edge synthesizers, for performing an inverse wavelet transform on said decoded reduced image and said series of sets of high-frequency images, thereby generating a reconstructed difference image; and a motion compensator coupled to said inverse wavelet transform processor, said third switch, and said memory, for adding said reconstructed difference image to said previous frame according to the motion vectors selected by said third switch to generate a new frame, outputting said new frame as a decoded frame, and storing said new frame in said memory for subsequent use as a previous frame.

2. The moving image encoder/decoder of claim 1, wherein said edge detector detects variations in rate of change of said pixel values from pixel to pixel.

3. The moving image encoder/decoder of claim 2, wherein:

said edge detector detects said variations horizontally in said digitized image, thereby generating a horizontal edge image, and detects said variations vertically in said digitized image, thereby generating a vertical edge image;

each set of decoded edge images in said series of said sets of decoded edge images comprises a decoded horizontal edge image and a decoded vertical edge image;

each edge synthesizer in said plurality of edge synthesizers filters said decoded horizontal edge image horizontally to generate a horizontal high-frequency image, and filters said decoded vertical edge image vertically to generate a vertical high-frequency image; and said inverse wavelet transform processor filters said reduced image horizontally and vertically with a low-pass filter, filters said horizontal high-frequency image horizontally with a high-pass filter and vertically with a low-pass filter, and filters said vertical high-frequency image vertically with a high-pass filter and horizontally with a low-pass filter.

4. The moving image encoder/decoder of claim 2, comprising a one-dimensional smoothing and down-sampling section disposed between said input terminal and said edge detector, for smoothing and down-sampling said digitized image horizontally to generate a horizontally down-sampled image, and smoothing and down-sampling said digitized image vertically to generate a vertically down-sampled image.

5. The moving image encoder/decoder of claim 4, wherein:

said edge detector detects said variations horizontally in said vertically down-sampled image, thereby generating a horizontal edge image, detects said variations vertically in said horizontally down-sampled image, thereby generating a vertical edge image, and detects said variations horizontally and vertically in said digitized image, thereby generating a diagonal edge image;

each set of decoded edge images in said series of said sets of decoded edge images comprises a decoded horizontal edge image, a decoded vertical edge image, and a decoded diagonal edge image;

each edge synthesizer in said plurality of edge synthesizers filters said decoded horizontal edge image horizontally to generate a horizontal high-frequency image, filters said decoded vertical edge image vertically to generate a vertical high-frequency image, and filters said decoded diagonal edge image horizontally and vertically to generate a diagonal high-frequency image; and said inverse wavelet transform processor filters said reduced image horizontally and vertically with a low-pass filter, filters said horizontal high-frequency image horizontally with a high-pass filter and vertically with a low-pass filter, filters said vertical high-frequency image vertically with a high-pass filter and horizontally with a low-pass filter, and filters said diagonal high-frequency image horizontally and vertically with a high-pass filter.

6. The moving image encoder/decoder of claim 1, wherein said two-dimensional smoothing and down-sampling section comprises a cascaded series of two-dimensional smoothing and down-sampling filters, for filtering and down-sampling said digitized image to generate a series of filtered and down-sampled images culminating in said reduced image.

7. The moving image encoder/decoder of claim 1, wherein:

said edge synthesis filters have coefficients generated by filtering a standard edge with a high-pass filter;

said standard edge consists of a first part and a second part, with pixel values that vary at one constant rate in said first part and at a different constant rate in said second part; and said inverse wavelet transform processor filters said sets of high-frequency images by a conjugate filter of said high-pass filter.

8. The moving image encoder/decoder of claim 1, wherein:

said two-dimensional smoothing filter also down-samples said first set of decoded edge images;

the sets of decoded edge images in said series of sets of decoded edge images are progressively smaller in size; and said inverse wavelet transform processor up-samples said decoded reduced image and said high-frequency images by interpolating zero-valued pixels.

9. The moving image encoder/decoder of claim 8, wherein said edge synthesizers also down-sample respective sets of decoded edge images.

\* \* \* \* \*